United States Patent
Majumder et al.

(10) Patent No.: US 12,284,087 B2
(45) Date of Patent: *Apr. 22, 2025

(54) CORRELATION SCORE BASED COMMONNESS INDICATION ASSOCIATED WITH A POINT ANOMALY PERTINENT TO DATA PATTERN CHANGES IN A CLOUD-BASED APPLICATION ACCELERATION AS A SERVICE ENVIRONMENT

(71) Applicant: Aryaka Networks, Inc., Newark, CA (US)

(72) Inventors: Shyamtanu Majumder, Bangalore (IN); Justin Joseph, Bangalore (IN); Johny Nainwani, Kota (IN); Parth Arvindbhai Patel, Surat (IN)

(73) Assignee: Aryaka Networks, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,493

(22) Filed: Jan. 17, 2024

(65) Prior Publication Data

US 2024/0154888 A1    May 9, 2024

Related U.S. Application Data

(63) Continuation of application No. 18/104,310, filed on Feb. 1, 2023, now Pat. No. 12,088,473, which is a
(Continued)

(51) Int. Cl.
*H04L 41/147* (2022.01)
*H04L 41/06* (2022.01)
(Continued)

(52) U.S. Cl.
CPC ............ *H04L 41/147* (2013.01); *H04L 41/06* (2013.01); *H04L 41/145* (2013.01); *H04L 43/04* (2013.01); *H04L 43/08* (2013.01); *H04L 67/10* (2013.01)

(58) Field of Classification Search
CPC ..... H04L 41/147; H04L 41/06; H04L 41/145; H04L 43/04; H04L 43/08; H04L 67/10
See application file for complete search history.

(56) References Cited

U.S. PATENT DOCUMENTS 6,742,124 B1   5/2004   Kilpatrick et al.
7,797,406 B2   9/2010   Patel et al.
(Continued)

FOREIGN PATENT DOCUMENTS

AU   2018200016 B2   9/2019
CN   106685746 A     5/2017
(Continued)

OTHER PUBLICATIONS

"A Systematic Review on Anomaly Detection for Cloud Computing Environments", Published at AICCC 2020: 2020 3rd Artificial Intelligence and Cloud Computing Conference, Published Online On [Dec. 2020] https://dl.acm.org/doi/pdf/10.1145/3442536.3442550.
(Continued)

*Primary Examiner* — Kristie D Shingles
(74) *Attorney, Agent, or Firm* — LEGALFORCE RAPC WORLDWIDE

(57) ABSTRACT

A method implemented through a data processing device of a computing network including includes detecting a point anomaly in real-time data associated with each network entity based on determining whether the real-time data falls outside a threshold expected value thereof, and representing the detected point anomaly in a full mesh Q node graph, with
(Continued)

Q being a number of features applicable for the each network entity. The method also includes capturing a transition in the point anomaly associated with a newly detected anomaly or non-anomaly in the real-time data associated with one or more of the Q number of features via the representation of the full mesh Q node graph, and deriving a current data correlation score for the point anomaly across the captured transition via the representation of the full mesh Q node graph.

20 Claims, 18 Drawing Sheets

Related U.S. Application Data continuation-in-part of application No. 18/088,806, filed on Dec. 27, 2022, now Pat. No. 12,095,639, which is a continuation-in-part of application No. 17/348,746, filed on Jun. 15, 2021, now Pat. No. 11,916,765, application No. 18/414,493 is a continuation of application No. 17/348,746, filed on Jun. 15, 2021, now Pat. No. 11,916,765, which is a continuation-in-part of application No. 16/660,813, filed on Oct. 23, 2019, now Pat. No. 11,070,440.

(51) Int. Cl.
*H04L 41/14* (2022.01)
*H04L 43/04* (2022.01)
*H04L 43/08* (2022.01)
*H04L 67/10* (2022.01)

(56) References Cited

U.S. PATENT DOCUMENTS

| | | |
|---|---|---|
| 7,930,752 B2 | 4/2011 | Hertzog et al. |
| 8,365,019 B2 | 1/2013 | Sailer et al. |
| 8,396,954 B2 | 3/2013 | Nagaraj et al. |
| 8,457,928 B2 | 6/2013 | Dang et al. |
| 8,489,685 B2 | 7/2013 | Bharadhwaj et al. |
| 8,504,879 B2 | 8/2013 | Poletto et al. |
| 8,543,642 B2 | 9/2013 | Corbett et al. |
| 8,601,564 B2 | 12/2013 | Wahl et al. |
| 8,601,575 B2 | 12/2013 | Mullarkey et al. |
| 8,688,620 B2 | 4/2014 | Viswanathan et al. |
| 8,719,447 B2 | 5/2014 | Gupta et al. |
| 8,862,728 B2 | 10/2014 | Jayachandran et al. |
| 8,903,593 B1 | 12/2014 | Addepalli et al. |
| 8,949,677 B1 | 2/2015 | Brundage et al. |
| 8,959,155 B1 | 2/2015 | Kwok et al. |
| 8,966,392 B2 | 2/2015 | Antony et al. |
| 8,966,503 B1 | 2/2015 | Dyer et al. |
| 9,083,740 B1 | 7/2015 | Ma et al. |
| 9,117,076 B2 | 8/2015 | Devost |
| 9,166,993 B1 | 10/2015 | Liu |
| 9,195,563 B2 | 11/2015 | Scarpelli |
| 9,224,163 B2 | 12/2015 | Padmanabhan et al. |
| 9,292,408 B2 | 3/2016 | Bernstein et al. |
| 9,367,421 B2 | 6/2016 | Gilbao et al. |
| 9,378,079 B2 | 6/2016 | Ivanova et al. |
| 9,379,951 B2 | 6/2016 | Mihnev |
| 9,483,049 B2 | 11/2016 | Maeda et al. |
| 9,558,347 B2 | 1/2017 | Chari et al. |
| 9,602,389 B1 | 3/2017 | Maveli et al. |
| 9,628,362 B2 | 4/2017 | Vasseur et al. |
| 9,652,354 B2 | 5/2017 | Filimonov et al. |
| 9,832,170 B2 | 11/2017 | Bharadhwaj et al. |
| 9,876,612 B1 | 1/2018 | Maveli et al. |
| 9,942,117 B1 | 4/2018 | Saini et al. |
| 9,983,092 B2 | 5/2018 | Howitt |
| 10,009,366 B2 | 6/2018 | Lefebvre et al. |
| 10,045,218 B1 | 8/2018 | Stapleton et al. |
| 10,116,521 B2 | 10/2018 | Kokkula et al. |
| 10,116,674 B2 | 10/2018 | Baradaran et al. |
| 10,129,274 B2 | 11/2018 | Sheth et al. |
| 10,154,053 B2 | 12/2018 | Yadav et al. |
| 10,220,167 B2 | 3/2019 | Mermoud et al. |
| 10,223,403 B2 | 3/2019 | Malhotra et al. |
| 10,326,787 B2 | 6/2019 | Wolkov et al. |
| 10,333,958 B2 | 6/2019 | Huang et al. |
| 10,355,730 B1 | 7/2019 | Zalewski et al. |
| 10,375,098 B2 | 8/2019 | Oliner et al. |
| 10,404,525 B2 | 9/2019 | Larsson et al. |
| 10,419,463 B2 | 9/2019 | Muddu et al. |
| 10,419,470 B1 | 9/2019 | Segev et al. |
| 10,438,124 B2 | 10/2019 | Kirk |
| 10,459,827 B1 | 10/2019 | Aghdale et al. |
| 10,505,819 B2 | 12/2019 | Yadav et al. |
| 10,511,545 B2 | 12/2019 | Patil et al. |
| 10,530,795 B2 | 1/2020 | Pande et al. |
| 10,581,977 B2 | 3/2020 | Goldfarb et al. |
| 10,592,324 B2 | 3/2020 | Puri et al. |
| 10,595,175 B2 | 3/2020 | Ramalho De Oliveira |
| 10,599,506 B2 | 3/2020 | Cohen et al. |
| 10,609,059 B2 | 3/2020 | Apostolopoulos |
| 10,635,563 B2 | 4/2020 | Salunke et al. |
| 10,652,254 B2 | 5/2020 | Kuperman et al. |
| 10,692,004 B1 | 6/2020 | Segev |
| 10,693,896 B2 | 6/2020 | Kune et al. |
| 10,713,109 B2 | 7/2020 | Tarlano et al. |
| 10,721,239 B2 | 7/2020 | Koottayi et al. |
| 10,728,263 B1 | 7/2020 | Neumann |
| 10,740,358 B2 | 8/2020 | Chan et al. |
| 10,749,884 B2 | 8/2020 | Bailey et al. |
| 10,853,161 B2 | 12/2020 | Ahad |
| 10,855,548 B2 | 12/2020 | Garvey et al. |
| 10,855,712 B2 | 12/2020 | Oliner et al. |
| 10,902,062 B1 | 1/2021 | Guha et al. |
| 10,902,468 B2 | 1/2021 | Abrol et al. |
| 10,904,270 B2 | 1/2021 | Muddu et al. |
| 10,904,276 B2 | 1/2021 | Phadke et al. |
| 10,909,241 B2 | 2/2021 | Puri et al. |
| 10,917,419 B2 | 2/2021 | Crotinger et al. |
| 10,949,283 B2 | 3/2021 | Yang et al. |
| 10,964,011 B2 | 3/2021 | Cosatto et al. |
| 10,972,482 B2 | 4/2021 | Schmidtler et al. |
| 10,999,325 B1 | 5/2021 | Chandana et al. |
| 11,023,353 B2 | 6/2021 | Poghosyan et al. |
| 11,036,715 B2 | 6/2021 | Jain et al. |
| 11,055,405 B1 | 7/2021 | Jin et al. |
| 11,070,440 B2 | 7/2021 | Patel et al. |
| 11,106,789 B2 | 8/2021 | Kraus et al. |
| 11,157,782 B2 | 10/2021 | Bathen et al. |
| 11,165,800 B2 | 11/2021 | Thampy |
| 11,169,514 B2 | 11/2021 | Song et al. |
| 11,181,930 B1 | 11/2021 | Konrardy et al. |
| 11,201,882 B2 | 12/2021 | Mirsky et al. |
| 11,275,643 B2 | 3/2022 | McCann et al. |
| 11,277,420 B2 | 3/2022 | Cote et al. |
| 11,288,111 B2 | 3/2022 | Xu et al. |
| 11,294,756 B1 | 4/2022 | Sadrieh et al. |
| 11,308,221 B2 | 4/2022 | Biswas et al. |
| 11,308,366 B2 | 4/2022 | Kim |
| 11,321,210 B2 | 5/2022 | Huang et al. |
| 11,343,268 B2 | 5/2022 | Apostolopoulos |
| 11,362,910 B2 | 6/2022 | Lin et al. |
| 11,386,075 B2 | 7/2022 | Schierz et al. |
| 11,388,072 B2 | 7/2022 | Wu et al. |
| 11,409,628 B2 | 8/2022 | Dang et al. |
| 11,409,869 B2 | 8/2022 | Schmidtler et al. |
| 11,410,061 B2 | 8/2022 | Dang et al. |
| 11,425,019 B2 | 8/2022 | Gal et al. |
| 11,442,429 B2 | 9/2022 | Laftchiev et al. |
| 11,463,464 B2 | 10/2022 | Zadeh et al. |
| 11,483,328 B2 | 10/2022 | Kirti et al. |
| 11,487,879 B2 | 11/2022 | Doyle et al. |
| 11,501,189 B2 | 11/2022 | Tiwari et al. |
| 11,632,383 B2 | 4/2023 | Oliner et al. |
| 11,675,646 B2 | 6/2023 | Gasthaus et al. |
| 11,743,275 B2 | 8/2023 | Tambuluri et al. |
| 11,777,786 B2 | 10/2023 | Elsakhawy et al. |

(56) References Cited

U.S. PATENT DOCUMENTS

| | | |
|---|---|---|
| 11,824,646 B1 | 11/2023 | Muddu et al. |
| 11,863,921 B2 | 1/2024 | Kulshreshtha et al. |
| 11,876,821 B1 | 1/2024 | Pratt et al. |
| 11,882,145 B2 | 1/2024 | Colquhoun et al. |
| 11,902,322 B2 | 2/2024 | Hutchinson et al. |
| 11,916,765 B2* | 2/2024 | Majumder ............ H04L 43/04 |
| 2004/0205374 A1 | 10/2004 | Poletto et al. |
| 2007/0150949 A1 | 6/2007 | Futamura et al. |
| 2007/0289013 A1 | 12/2007 | Lim |
| 2007/0294768 A1 | 12/2007 | Moskovitch et al. |
| 2008/0208526 A1 | 8/2008 | Thibaux et al. |
| 2013/0167232 A1 | 6/2013 | Weber et al. |
| 2013/0198119 A1 | 8/2013 | Eberhardt, III et al. |
| 2014/0165207 A1 | 6/2014 | Engel et al. |
| 2015/0294002 A1 | 10/2015 | Corbett et al. |
| 2016/0179993 A1 | 6/2016 | Maturana et al. |
| 2016/0182309 A1 | 6/2016 | Maturana et al. |
| 2016/0219066 A1 | 7/2016 | Vasseur et al. |
| 2016/0226985 A1 | 8/2016 | Yoon et al. |
| 2016/0261482 A1 | 9/2016 | Mixer et al. |
| 2016/0342805 A1 | 11/2016 | Lim |
| 2016/0358065 A1 | 12/2016 | Gedge et al. |
| 2016/0359695 A1* | 12/2016 | Yadav ............ H04L 43/04 |
| 2017/0012813 A1 | 1/2017 | Skaaksrud et al. |
| 2017/0235808 A1 | 8/2017 | Salame |
| 2018/0039555 A1 | 2/2018 | Salunke et al. |
| 2018/0234443 A1 | 8/2018 | Wolkov et al. |
| 2018/0239906 A1 | 8/2018 | Aguayo Gonzalez et al. |
| 2018/0241764 A1 | 8/2018 | Nadolski et al. |
| 2018/0268015 A1 | 9/2018 | Sugaberry |
| 2018/0270261 A1 | 9/2018 | Pande et al. |
| 2018/0302291 A1 | 10/2018 | Srinivasan et al. |
| 2018/0316707 A1 | 11/2018 | Dodson et al. |
| 2019/0098037 A1 | 3/2019 | Shenoy, Jr. et al. |
| 2019/0101924 A1 | 4/2019 | Styler et al. |
| 2019/0138938 A1 | 5/2019 | Vasseur et al. |
| 2019/0179300 A1 | 6/2019 | Cella et al. |
| 2019/0272470 A1 | 9/2019 | Bandi et al. |
| 2019/0324441 A1 | 10/2019 | Cella et al. |
| 2019/0339688 A1 | 11/2019 | Cella et al. |
| 2020/0053108 A1 | 2/2020 | Cili et al. |
| 2020/0097810 A1 | 3/2020 | Hetherington et al. |
| 2020/0103886 A1 | 4/2020 | Gandenberger |
| 2020/0272864 A1 | 8/2020 | Faust et al. |
| 2020/0272973 A1 | 8/2020 | Sun et al. |
| 2020/0285997 A1 | 9/2020 | Bhattacharyya et al. |
| 2020/0336502 A1 | 10/2020 | Xu et al. |
| 2020/0336503 A1 | 10/2020 | Xu et al. |
| 2020/0337631 A1 | 10/2020 | Sahin |
| 2020/0351283 A1 | 11/2020 | Salunke et al. |
| 2020/0374306 A1 | 11/2020 | Dai |
| 2020/0387797 A1 | 12/2020 | Ryan et al. |
| 2021/0004682 A1 | 1/2021 | Gong et al. |
| 2021/0081293 A1 | 3/2021 | Sahni et al. |
| 2021/0126836 A1 | 4/2021 | Patel et al. |
| 2021/0194751 A1 | 6/2021 | Bates et al. |
| 2021/0197720 A1 | 7/2021 | Houston et al. |
| 2021/0273961 A1 | 9/2021 | Humphrey et al. |
| 2021/0314242 A1 | 10/2021 | Majumder et al. |
| 2021/0320939 A1 | 10/2021 | Salunke et al. |
| 2021/0334656 A1 | 10/2021 | Sjögren et al. |
| 2021/0350113 A1 | 11/2021 | Sjögren et al. |
| 2021/0365643 A1 | 11/2021 | Agrawal et al. |
| 2022/0020188 A1 | 1/2022 | Garvey et al. |
| 2022/0078098 A1 | 3/2022 | Padfield et al. |
| 2022/0174097 A1 | 6/2022 | Biswas et al. |
| 2022/0237102 A1 | 7/2022 | Bugdayci et al. |
| 2022/0263870 A1 | 8/2022 | Kossey et al. |
| 2022/0358124 A1 | 11/2022 | Sriharsha |
| 2023/0126571 A1 | 4/2023 | Kirti et al. |
| 2023/0140793 A1 | 5/2023 | Joseph et al. |
| 2023/0155884 A1 | 5/2023 | Goehring et al. |
| 2023/0179488 A1 | 6/2023 | Nainwani et al. |
| 2023/0344841 A1 | 10/2023 | Tambuluri et al. |
| 2024/0022595 A1 | 1/2024 | Humphrey et al. |

FOREIGN PATENT DOCUMENTS

| | | |
|---|---|---|
| CN | 110084165 A | 8/2019 |
| CN | 111813928 A | 10/2020 |
| CN | 109327453 B | 4/2021 |
| CN | 113079129 A | 7/2021 |
| CN | 108765373 B | 3/2022 |
| CN | 114298240 A | 4/2022 |
| CN | 111527478 B | 8/2022 |
| CN | 115169430 A | 10/2022 |
| CN | 117156442 A | 12/2023 |
| CN | 117201355 A | 12/2023 |
| EP | 1772993 A1 | 4/2007 |
| EP | 2400693 A2 | 12/2011 |
| EP | 3037901 A2 | 6/2016 |
| EP | 3388941 A1 | 10/2018 |
| EP | 3304315 B1 | 4/2019 |
| EP | 2984567 B1 | 8/2021 |
| JP | 6457693 B1 | 1/2019 |
| JP | 2019096339 A | 6/2019 |
| JP | 6896111 B2 | 7/2021 |
| JP | 2021192155 A | 12/2021 |
| KR | 102015753 B1 | 8/2019 |
| KR | 20210035296 A | 3/2021 |
| KR | 102325629 B1 | 11/2021 |
| KR | 102471165 B1 | 11/2022 |
| WO | 2011008419 A2 | 1/2011 |
| WO | 2011101691 A1 | 8/2011 |
| WO | 2018140556 A1 | 8/2018 |
| WO | 2018144234 A1 | 8/2018 |
| WO | 2020142446 A2 | 7/2020 |
| WO | 2020180887 A1 | 9/2020 |
| WO | 2021234586 A1 | 11/2021 |
| WO | 2022160902 A1 | 8/2022 |

OTHER PUBLICATIONS

"Real-time big data processing for anomaly detection: A Survey", by Riyaz Ahamed et al., Published at International Journal of Information Management, Published Online On [Aug. 24, 2018] https://sci-hub.hkvisa.net/10.1016/j.ijinfomgt.2018.08.006.

"A Cloud Based Automated Anomaly Detection Framework", Published at the University of Texas at Arlington, Published Online On [Dec. 2014] https://rc.library.uta.edu/uta-ir/bitstream/handle/10106/24888/DattaKumar_uta_2502M_12843.pdf?sequence=1&isAllowed=y.

"A Review of Anomaly Detection Systems in Cloud Networks and Survey of Cloud Security Measures in Cloud Storage Applications", Published at Journal of Information Security, Published Online On [Mar. 12, 2015] https://www.scirp.org/html/8-7800280_55903.htm?pagespeed=noscript.

"Cloud-based multiclass anomaly detection and categorization using ensemble learning", Published at Journal of Cloud Computing:Advances, Systems and Applications, Published Online On [Nov. 3, 2022] https://journalofcloudcomputing.springeropen.com/counter/pdf/10.1186/s13677-022-00329-y.pdf.

"Efficient Approaches for Intrusion Detection in Cloud Environment", Published at International Conference on Computing, Communication and Automation (ICCCA2016), Published Online On [Jan. 16, 2017] https://ieeexplore.ieee.org/abstract/document/7813926.

"Anomaly Detection and Trust Authority in Artificial Intelligence and Cloud Computing", Published at Computer Networks,Published Online On [Oct. 23, 2020] https://sci-hub.hkvisa.net/10.1016/j.comnet.2020.107647.

"Survey: Anomaly Detection in Cloud BasedNetworks and Security Measures in Cloud Date Storage Applications", by Dr. Chinthagunta Mukundha, Published at International Journal of Science and Research, Published Online On [Mar. 3, 2016] https://www.ijsr.net/archive/v5i3/NOV161737.pdf.

"Machine Learning for Anomaly Detection and Categorization in Multi-cloud Environments", Published at Washington University in St. Louis, by Tara Salman et al., Published Online On [Jun. 28, 2017] https://www.cse.wustl.edu/~jain/papers/ftp/cscloud.pdf.

(56) References Cited

OTHER PUBLICATIONS

"A Novel Anomaly Detection Scheme Based on Principal Component Classifier", by Mei-Ling Shyu et al., Published at Department of Electrical and Computer Engineering University of Miami Coral Gables, FL, USA, Published Online On [2003] https://apps.dtic.mil/sti/pdfs/ADA465712.pdf.

"Classification-Based Anomaly Detection for General Data", Published at School of Computer Science and Engineering the Hebrew University of Jerusalem, Israel, by Liron Bergman et al., Published Online On [May 5, 2020] https://arxiv.org/pdf/2005.02359.pdf.

"Machine Learning: Anomaly Detection", Published at University of Maryland, Center for Advanced Life Cycle Engineering, by Myeongsu Kang, Published In [2018] https://sci-hub.hkvisa.net/10.1002/9781119515326.ch6.

"Anomaly detection as-a-Service for Predictive Maintenance", Published at Computer Science and Engineering—Ingegneria Informatica, by Daniele De Dominicis, Found Online On [Apr. 11, 2023] https://www.politesi.polimi.it/bitstream/10589/191534/5/Article_Format_Thesis-Daniele_De_Dominicis.pdf.

"Experience Report: Anomaly Detection of Cloud Application Operations Using Log and Cloud Metric Correlation Analysis", by Mostafa Farshchi et al., Published at IEEE, Published Online On [Nov. 2015] https://sci-hub.3800808.com/10.1109/issre.2015.7381796.

"Correlation-Based Anomaly Detection Method for Multi-sensor System", by Han Li et al., Published at Computational Intelligence and Neuroscience vol. 2022, Published Online On [May 31, 2022] https://www.researchgate.net/publication/361005605_Correlation-Based_Anomaly_Detection_Method_for_Multi-sensor_System.

"Performance Issue Identification in Cloud Systems with Relational-Temporal Anomaly Detection", by Wenwei Gu., Published at the Chinese University of Hong Kong, Found Online On [Feb. 28, 2024] https://arxiv.org/pdf/2307.10869.pdf.

"A Systematic Review on Anomaly Detection for Cloud Computing Environments", by Tanja Hagemann et al., Published at AICCC '20: Proceedings of the 2020 3rd Artificial Intelligence and Cloud Computing Conference, Published Online On [Mar. 15, 2021] https://dl.acm.org/doi/pdf/10.1145/3442536.3442550.

"Correlated Anomaly Detection from Large Streaming Data", by Zheng Chen et al., Published at IEEE International Conference on Big Data, Published Online On [Dec. 1, 2018] https://arxiv.org/ftp/arxiv/papers/1812/1812.09387.pdf.

"Fault Detection for Cloud Computing Systems with Correlation Analysis", by Tao Wang et al., Published at IEEE, Published In [2015] https://dl.ifip.org/db/conf/im/im2015m/134446.pdf.

"Anomaly Detection for Cloud Systems with Dynamic Spatiotemporal Learning", by Mingguang Yu et al., Published at Tech Science Press, Published Online On [Jun. 21, 2023] https://cdn.techscience.cn/files/Iasc/2023/37-2/TSP_IASC_38798/TSP_IASC_38798.pdf.

"A Correlation-Change Based Feature Selection Method for IoT Equipment Anomaly Detection", by Shen Su et al., Published at Applied Sciences, Published Online On [Jan. 28, 2019] https://www.mdpi.com/2076-3417/9/3/437.

"Anomaly Detection Analysis Based on Correlation of Features in Graph Neural Network", by Hoon Ko., Published at Multimedia Tools and Applications, Published Online On [Aug. 21, 2023] https://link.springer.com/content/pdf/10.1007/s11042-023-15635-z.pdf.

"Intrusion Detection in Cloud Computing Based on Time Series Anomalies Utilizing Machine Learning", by Abdel-Rahman Al-Ghuwair et al., Published at Journal of Cloud Computing, Published Online On [Aug. 29, 2023] https://journalofcloudcomputing.springeropen.com/counter/pdf/10.1186/s13677-023-00491-x.pdf.

"Anomaly Detection for Fault Detection in Wireless Community Networks Using Machine Learning", by Llorenç Cerda-Alabern et al., Published at Elsevier, Published Online On [Feb. 23, 2023] https://upcommons.upc.edu/bitstream/handle/2117/386764/1-s2.0-S0140366423000658-main.pdf?sequence=1&isAllowed=y.

"Anomaly Detection In Cloud Network Data", by Tharindu Lakshan Yasarathna et al., Published at IEEE, Published Online On [Jan. 12, 2021] http://repository.kln.ac.lk/bitstream/handle/123456789/23075/10.pdf?sequence=1.

"Anomaly Detection in the Services Provided by Multi Cloud Architectures: a Survey", by Mahendra Kumar Ahirwar et al., Published at International Journal of Research in Engineering and Technology, Found Online On [Feb. 28, 2024] https://web.archive.org/web/20170809115103id_/http://esatjournals.net/ijret/2014v03/09/IJRET20140309030.pdf.

"Anomaly Detection in Time Series: A Comprehensive Evaluation", by Sebastian Schmidl et al., Published at Proceedings of the VLDB Endowment vol. 15, Published Online On [May 1, 2022] https://www.vldb.org/pvldb/vol15/p1779-wenig.pdf.

"Performance Anomaly Detection and Resolution for Autonomous Clouds", by Olumuyiwa Ibidunmoye, Published at Umeå University, Found Online On [Feb. 28, 2024] https://www.diva-portal.org/smash/get/diva2:1157924/FULLTEXT03.pdf.

"An Edge-Cloud Collaboration Architecture for Pattern Anomaly Detection of Time Series in Wireless Sensor Networks", by Cong Gao et al., Published at Complex & Intelligent Systems, Published Online on [Jun. 17, 2021] https://link.springer.com/content/pdf/10.1007/s40747-021-00442-6.pdf.

"Detecting Performance Degradation in Cloud Systems Using LSTM Autoencoders", by Spyridon Chouliaras et al., Published at International Conference on Advanced Information Networking and Applications, Published Online On [Apr. 27, 2021] https://eprints.bbk.ac.uk/id/eprint/43771/8/43771a.pdf.

"A Security Monitoring Method Based on Autonomic Computing for the Cloud Platform", by Jingjie Zhang et al., Published at Journal of Electrical and Computer Engineering, Published Online On [Mar. 5, 2018] https://downloads.hindawi.com/journals/jece/2018/8309450.pdf.

"An Enterprise Time Series Forecasting System for Cloud Applications Using Transfer Learning", by Arnak Poghosyan et al., Published at Sensors, Published Online On [Feb. 25, 2021] https://sci-hub.3800808.com/10.3390/s21051590.

"Deep Learning for Time Series Anomaly Detection: A Survey", by Zahra Zamanzadeh Darban et al., Published at arxiv, Found Online On [Feb. 28, 2024] https://arxiv.org/pdf/2211.05244.pdf.

"Deep Learning for Anomaly Detection in Time-Series Data: Review, Analysis, and Guidelines", by Kukjin Choi et al., Published at IEEE Access, Published Online On [Aug. 26, 2021] https://ieeexplore.ieee.org/stamp/stamp.jsp?arnumber=9523565.

\* cited by examiner

CORRELATION SCORE BASED COMMONNESS INDICATION ASSOCIATED WITH A POINT ANOMALY PERTINENT TO DATA PATTERN CHANGES IN A CLOUD-BASED APPLICATION ACCELERATION AS A SERVICE ENVIRONMENT

CLAIM OF PRIORITY

This Application is a Continuation Application of, and claims priority to, co-pending U.S. patent application Ser. No. 17/348,746 titled CORRELATION SCORE BASED COMMONNESS INDICATION ASSOCIATED WITH A POINT ANOMALY PERTINENT TO DATA PATTERN CHANGES IN A CLOUD-BASED APPLICATION ACCELERATION AS A SERVICE ENVIRONMENT filed on Jun. 15, 2021 and co-pending U.S. patent application Ser. No. 18/104,310 titled METHOD, DEVICE AND SYSTEM FOR ENHANCING PREDICTIVE CLASSIFICATION OF ANOMALOUS EVENTS IN A CLOUD-BASED APPLICATION ACCELERATION AS A SERVICE ENVIRONMENT filed on Feb. 1, 2023. Co-pending U.S. patent application Ser. No. 18/104,310 is a Continuation-in-Part Application of co-pending U.S. patent application Ser. No. 18/088,806 titled METHOD, DEVICE AND SYSTEM FOR IMPROVING PERFORMANCE OF POINT ANOMALY BASED DATA PATTERN CHANGE DETECTION ASSOCIATED WITH NETWORK ENTITY FEATURES IN A CLOUD-BASED APPLICATION ACCELERATION AS A SERVICE ENVIRONMENT filed on Dec. 27, 2022, which itself is a Continuation-in-Part Application of co-pending U.S. patent application Ser. No. 17/348,746. Co-pending U.S. patent application Ser. No. 17/348,746 is a Continuation-in-Part Application of U.S. patent application Ser. No. 16/660,813 titled EFFICIENT DETECTION AND PREDICTION OF DATA PATTERN CHANGES IN A CLOUD-BASED APPLICATION ACCELERATION AS A SERVICE ENVIRONMENT filed on Oct. 23, 2019 and issued as U.S. Pat. No. 11,070,440 on Jul. 20, 2021. The contents of each of the aforementioned applications are incorporated by reference herein in entirety thereof.

FIELD OF TECHNOLOGY

This disclosure relates generally to cloud computing networks and, particularly, to a method, a system and/or a device for correlation score based commonness indication associated with a point anomaly pertinent to data pattern changes in a cloud-based application acceleration as a service environment.

BACKGROUND

A cloud-based application acceleration as a service environment may include a number of network entities (e.g., Point of Presence (POP) locations, routers), sometimes even in the thousands and the tens of thousands. Each network entity may be associated with one or more feature(s) (e.g., latency metrics) that can be monitored. However, as the number of network entities in a typical cloud-based application acceleration as a service environment is large and each network entity is associated with one or more feature(s), detection of problematic data patterns associated with the number of network entities may be tedious and expensive, time-wise and storage-wise.

SUMMARY

Disclosed are a method, a system and/or a device for correlation score based commonness indication associated with a point anomaly pertinent to data pattern changes in a cloud-based application acceleration as a service environment.

In one aspect, a method of a computing network implemented in a data processing device including a processor communicatively coupled to a memory is disclosed. The method includes detecting real-time data associated with each network entity of a number of network entities of the computing network for each feature thereof sequentially in time, and detecting a point anomaly in the real-time data associated with the each network entity based on determining whether the real-time data falls outside a threshold expected value thereof. The method also includes representing the detected point anomaly in a full mesh Q node graph, where Q is a number of features applicable for the each network entity, and capturing a transition in the point anomaly associated with a newly detected anomaly or non-anomaly in the real-time data associated with one or more feature(s) of the Q number of features via the representation of the full mesh Q node graph.

Further, the method includes deriving a current data correlation score for the point anomaly across the captured transition as:

$$CS = \sum_{i=1}^{APC} \frac{\left(1 - \frac{EWP_i}{TSAC}\right)}{APC},$$

where CS is the current data correlation score for the point anomaly across the captured transition, APC is a count of a total number of pairs of Y current anomalous features in the Q number of features and is given by $^YC_2 + {}^YC_1$, $EWP_i$ is a weight of an edge of the $i^{th}$ pair of the Y current anomalous features in the representation of the full mesh Q node combination of the Y current anomalous features contributing to the point anomaly with respect to an equivalent Y anomalous features contributing to another previously detected point anomaly associated with the each network entity.

In another aspect, a data processing device includes a memory, and a processor communicatively coupled to the memory. The processor executes instructions to detect real-time data associated with each network entity of a number of network entities of a computing network for each feature thereof sequentially in time, and detect a point anomaly in the real-time data associated with the each network entity based on determining whether the real-time data falls outside a threshold expected value thereof. The processor also executes instructions to represent the detected point anomaly in a full mesh Q node graph, where Q is a number of features applicable for the each network entity, and capture a transition in the point anomaly associated with a newly detected anomaly or non-anomaly in the real-time data associated with one or more feature(s) of the Q number of features via the representation of the full mesh Q node graph.

Further, the processor executes instructions to derive a current data correlation score for the point anomaly across the captured transition as:

$$CS = \sum_{i=1}^{APC} \frac{\left(1 - \frac{EWP_i}{TSAC}\right)}{APC},$$

where CS is the current data correlation score for the point anomaly across the captured transition, APC is a count of a total number of pairs of Y current anomalous features in the Q number of features and is given by $^YC_2+^YC_1$, $EWP_i$ is a weight of an edge of the $i^{th}$ pair of the Y current anomalous features in the representation of the full mesh Q node combination of the Y current anomalous features contributing to the point anomaly with respect to an equivalent Y anomalous features contributing to another previously detected point anomaly associated with the each network entity.

In yet another aspect, a computing system includes a number of network entities of a computer network, and a data processing device executing instructions to detect real-time data associated with each network entity of the number of network entities for each feature thereof sequentially in time, and detect a point anomaly in the real-time data associated with the each network entity based on determining whether the real-time data falls outside a threshold expected value thereof. The data processing device also executes instructions to represent the detected point anomaly in a full mesh Q node graph, where Q is a number of features applicable for the each network entity, and capture a transition in the point anomaly associated with a newly detected anomaly or non-anomaly in the real-time data associated with one or more feature(s) of the Q number of features via the representation of the full mesh Q node graph.

Further, the computing system executes instructions to derive a current data correlation score for the point anomaly across the captured transition as:

$$CS = \sum_{i=1}^{APC} \frac{\left(1 - \frac{EWP_i}{TSAC}\right)}{APC},$$

where CS is the current data correlation score for the point anomaly across the captured transition, APC is a count of a total number of pairs of Y current anomalous features in the Q number of features and is given by $^YC_2+^YC_1$, $EWP_i$ is a weight of an edge of the $i^{th}$ pair of the Y current anomalous features in the representation of the full mesh Q node combination of the Y current anomalous features contributing to the point anomaly with respect to an equivalent Y anomalous features contributing to another previously detected point anomaly associated with the each network entity.

The methods and systems disclosed herein may be implemented in any means for achieving various aspects, and may be executed in a form of a machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of accompanying drawings, in which like references indicate similar elements and in which.

Other features of the present embodiments will be apparent from the accompanying drawings and from the detailed description that follows.

DETAILED DESCRIPTION

Example embodiments, as described below, may be used to realize correlation score based commonness indication associated with a point anomaly pertinent to data pattern changes in a cloud-based application acceleration as a service environment. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
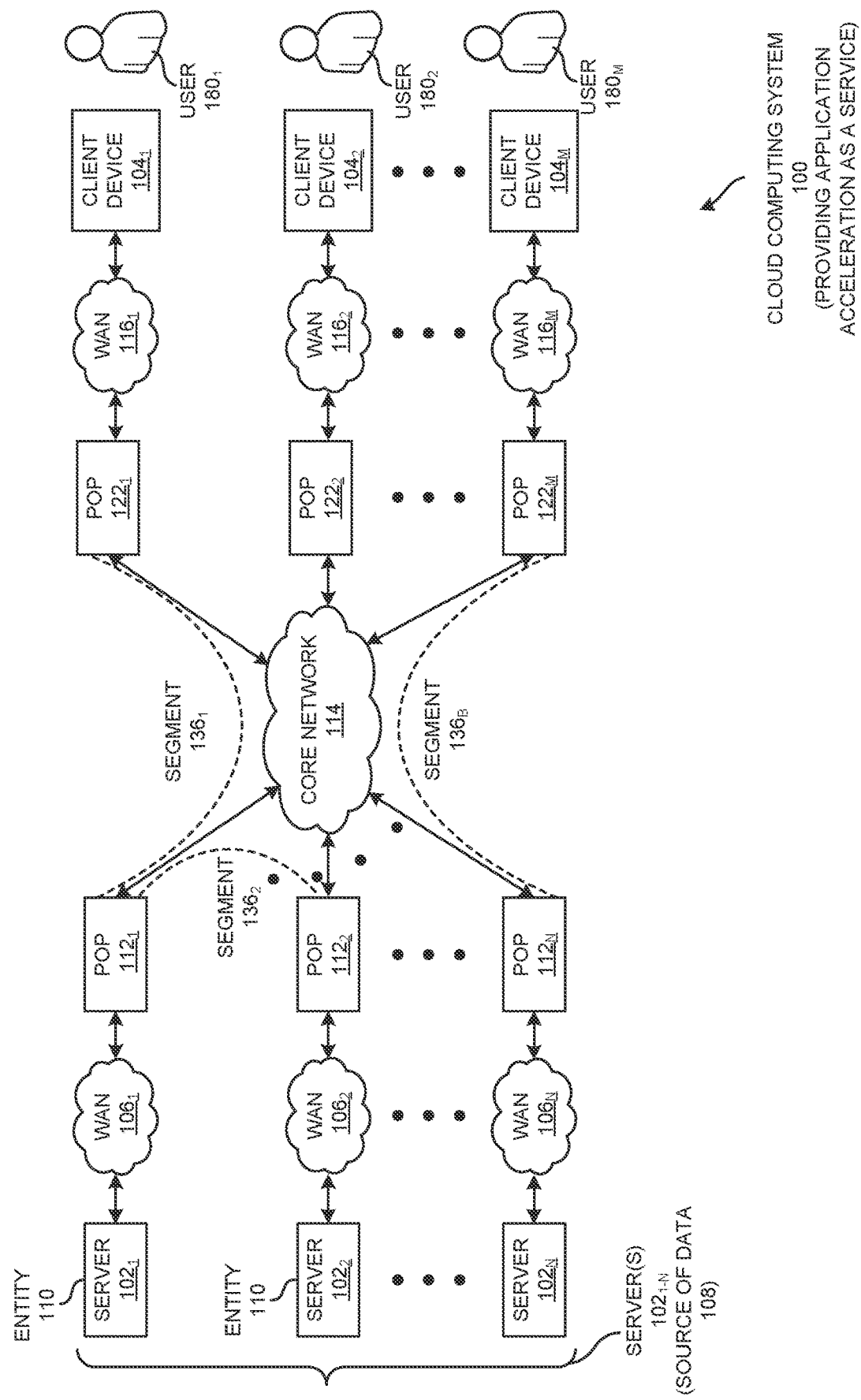
FIG. 1 is a schematic view of a cloud computing system, according to one or more embodiments.

FIG. 1 shows a cloud computing system 100, according to one or more embodiments. In one or more embodiments, cloud computing system 100 may include a number of servers $102_{1-N}$ communicatively coupled to one another through a computer network (e.g., a Wide Area Network (WAN) $106_{1-N}$, a Local Area Network (LAN) (not shown)) and a number of client devices $104_{1-M}$ (example data processing devices such as desktops, laptops, and mobile devices; even servers may be examples of client devices $104_{1-M}$) communicatively coupled to the number of servers $102_{1-N}$ through a corresponding WAN $116_{1-M}$. In one or more embodiments, servers $102_{1-N}$ may be a source of data 108 (e.g., multimedia data, text, video and/or audio data) to the aforesaid number of client devices $104_{1-M}$.

In some embodiments, one or more server(s) $102_{1-N}$ may be associated with a head office of a business entity (e.g., entity 110) and one or more client device(s) $104_{1-M}$ may be associated with branch offices of said business entity (e.g., entity 110). In one or more embodiments, a number of Point of Presence (POP) locations, POPs $112_{1-N}$ and POPs $122_{1-M}$, may be present in cloud computing system 100. FIG. 1 shows a correspondence between the number of WANs, WANs $106_{1-N}$ and WANs $116_{1-M}$, and the number of POPs, POPs $112_{1-N}$ and POPs $122_{1-M}$, merely for example purposes. The aforementioned correspondence should not be considered limiting.

Each POP location discussed above may be an access point to the Internet. For example, the each POP location may be a physical location that houses servers, routers, Asynchronous Transfer Mode (ATM) switches and/or digital/analog call aggregators. The each POP location may either be part of the facilities of a telecommunications provider that an Internet service provider (ISP) rents or a location separate from the telecommunications provider. The ISPs in cloud computing system 100 may have multiple POP locations, sometimes numbering in the thousands and the tens of thousands. The POPs, POP $112_{1-N}$ and POPs $122_{1-M}$, may also be located at Internet exchange points and co-location centers.

In one or more embodiments, servers $102_{1-N}$ and client devices $104_{1-M}$ may be spread across different geographies (e.g., regions, countries). In one or more embodiments, WANs $106_{1-N}$ and WANs $116_{1-M}$ may be enabled through a variety of networking protocols. In some embodiments, WANs $106_{1-N}$ and WANs $116_{1-M}$ may be leased lines or Internet (e.g., egress/ingress only). In one or more embodiments, cloud computing system 100 may include a core network 114 including a private network and/or a public network that utilizes WANs $116_{1-M}$ to communicate with POPs $122_{1-M}$. In one or more embodiments, core network 114 may also utilize WANs $116_{1-M}$ to communicate with external services (e.g., associated with service providers) and/or Content Delivery Networks (CDNs).

In some embodiments, a server $102_{1-N}$ and a client device $104_{1-M}$ may securely share data 108 over a WAN $106_{1-N}$ and a WAN $116_{1-M}$ through a private network using any of public addresses of source and destination routers, pools of addresses represented by a firewall, using a Multiprotocol Label Switching (MPLS) label, and using a Virtual Local Area Network (VLAN) tag. In one such example embodiment, a client device $104_{1-M}$ (e.g., a desktop, a laptop, a notebook) may be executing a client application such as Windows Explorer®, Microsoft® Word® and Internet Explorer® thereon and one or more open client connections to the number of servers $102_{1-N}$. In one or more embodiments, communication of data 108 between the number of servers $102_{1-N}$ and the number of client devices $104_{1-M}$ may be accelerated using application acceleration services.

In one or more embodiments, POPs $112_{1-N}$ and POPs $122_{1-M}$, and, for example, optional Customer Premise Equipment (CPE), may perform protocol dependent proxy functions (e.g., singly or split across POPs and/or optional CPEs) to resolve bandwidth limitation or to reduce communication times by simplifying the protocol or anticipating requests on behalf of users (e.g., users $180_{1-M}$) of the number of client devices $104_{1-M}$. A combination of protocol dependent and protocol independent functions to solve bandwidth reduction and/or communication time reduction may be defined as application acceleration. In one or more embodiments, cloud computing system 100 shown in FIG. 1 may provide application acceleration as a service.

It should be noted that, in one or more scenario(s), some data processing devices may also be communicatively coupled to one another through, for example, an internal LAN. In one or more embodiments, each of POPs $112_{1-N}$ and POPs $122_{1-M}$ may be a pool of servers providing WAN optimization and application acceleration (e.g., acceleration of data 108 as application data and/or an enterprise application associated with data 108). In one or more embodiments, POPs $112_{1-N}$ and POPs $122_{1-M}$ may be communicatively coupled to each other directly or indirectly through core network 114. In one example embodiment, core network 114, WANs $106_{1-N}$ and WANs $116_{1-M}$ may use leased lines and/or Internet.

In one or more embodiments, POPs $112_{1-N}$ and POPs $122_{1-M}$ may route the transport streams and/or the packet streams that includes data 108 on behalf of a server $102_{1-N}$ from a closest POP (e.g., POP $112_{1-N}$) thereto to a closest POP $122_{1-M}$ to a client device $104_{1-M}$, and then onward to client device $104_{1-M}$. In one or more embodiments, the optional CPEs (not shown) may be configured to perform secure transport of data 108 and communicate the secured data 108 from one or more server(s) $102_{1-N}$ to client devices $104_{1-M}$ (and even one or more other server(s) $102_{1-N}$), with optional intervening firewalls, through an Internet Protocol Security (IPsec) tunnel, a Generic Routing Encapsulation (GRE) tunnel, VLANs, and MPLS labels using IP headers. In one or more embodiments, the use of the optional CPEs may enable resolving bandwidth limitation(s) in the first/last mile.

In one or more embodiments, the use of the optional CPEs may enable faster data communication between servers $102_{1-N}$ and client devices $104_{1-M}$ if the communication line has a low bandwidth. In one example embodiment, storage in the optional CPEs may be constituted by flash memory devices. In one or more alternate embodiments, the optional CPEs may be coupled to or internally include other types of non-volatile storage devices that include hard drives, flash drives, solid state devices, etc.

In one or more embodiments, the use of POPs $112_{1-N}$ and POPs $122_{1-M}$ may eliminate the requirement of having intelligent synchronized WAN optimization equipment for solving latency and bandwidth at the ends of servers $102_{1-N}$ and client devices $104_{1-M}$. In addition, in one or more embodiments, the use of MPLS may be eliminated at core network 114 as POPs $112_{1-N}$ and POPs $122_{1-M}$ speed up data communication with no loss in packets and/or delay. In one or more embodiments, acceleration of data 108 may be possible as POPs $112_{1-N}$ and POPs $122_{1-M}$ are intelligently designed to analyze the destination of packets of data 108 and to communicate said packets to client devices $104_{1-M}$ without compromising and/or modifying client private networks.

Figure 2:
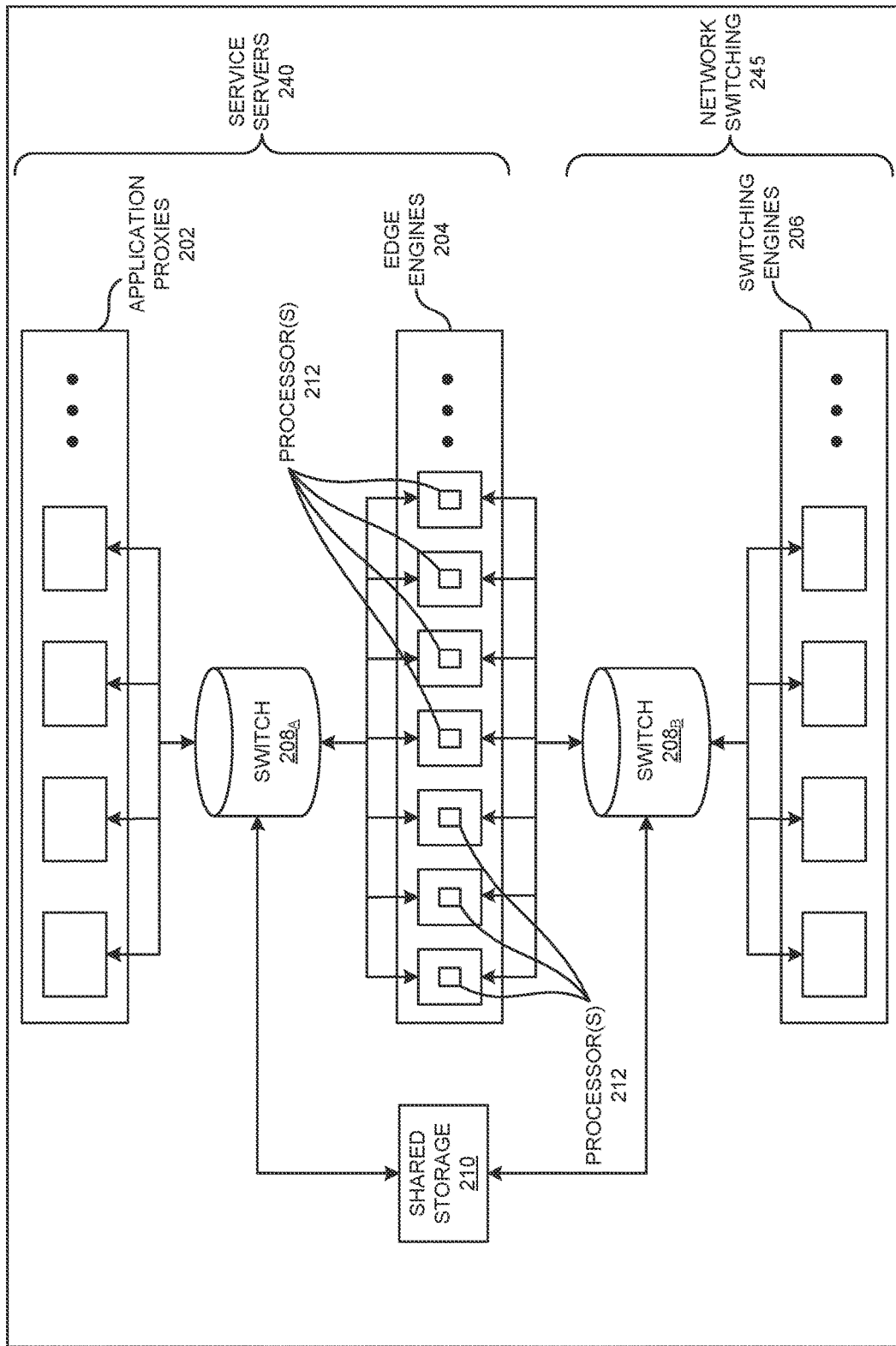
FIG. 2 is a schematic view of a Point of Presence (POP) device of FIG. 1, according to one or more embodiments.

FIG. 2 shows any of POPs $112_{1-N}$ and POPs $122_{1-M}$ (device form), according to one or more embodiments. In one or more embodiments, every engine of each of POPs $112_{1-N}$ and POPs $122_{1-M}$ may be scalable with load balancers. Also, in one or more embodiments, the engines of the each of POPs $112_{1-N}$ and POPs $122_{1-M}$ may enable sharing of resources among different customers thereof, thereby enabling multi-tenancy (e.g., multiple customers accessing the same hardware and software resources in the each of POPs $112_{1-N}$ and POPs $122_{1-M}$).

In one or more embodiments, the each of POPs $112_{1-N}$ and POPs $122_{1-M}$ may include a pool of servers providing application acceleration. In one or more embodiments, the each of POPs $112_{1-N}$ and POPs $122_{1-M}$ may include application proxies 202 to implement and extend a number of protocols such as Common Internet File System (CIFS), Hypertext Transfer Protocol (HTTP), Messaging Application Programming Interface (MAPI), Simple Mail Transfer Protocol (SMTP), etc., edge engines 204 to perform WAN data redundancy removal, transparent object caching, IPsec/Secure Sockets Layer (SSL) security, POP stream shaping, POP-POP data encoding, etc., and switching engines 206 to perform POP-POP routing, Quality of Service (QoS), packet classification, stream shaping and load-balancing.

In one or more embodiments, the each of POPs $112_{1-N}$ and POPs $122_{1-M}$ may include switches $208_A$-B to enable communication between application proxies 202, edge engines 204 and switching engines 206. In one embodiment, application proxies 202, edge engines 204 and switch $208_A$ may function as service servers 240. In one or more embodiments, the function as a service server 240 may execute on one machine, or as one process shared across customers or unique per customer. Service servers 240 may provide QoS as packets are delivered based on priority order using application proxies 202 and edge engines 204 based on the type of data 108, application of data 108, security of data 108, etc.

Switch $208_B$ and switching engines 206 may manage network switching 245. In one or more embodiments, network switching 245 may be the function(s) performed by switching engine(s) 206 to forward packets of data 108 through the network (e.g., WANs $106_{1-N}$ and WANs $116_{1-M}$). In one or more embodiments, POPs $112_{1-N}$ and POPs $122_{1-M}$ may also have an optional storage device (e.g., shared storage 210) to aid data redundancy removal and transportation. In one or more embodiments, any of POPs $112_{1-N}$ and POPs $122_{1-M}$ may include a processor 212 to perform the functionalities described herein.

In one or more embodiments, data redundancy removal may include a class of techniques to remove duplicate information between senders and receivers by capturing histories of data streams and holding these histories beyond the lives of connections. In one or more embodiments, POPs $112_{1-N}$ and POPs $122_{1-M}$ may be shared among different clients and different branches. In addition, in one embodiment, the engines of POPs $112_{1-N}$ and POPs $122_{1-M}$ may be shared by different clients. In one or more embodiments, POPs $112_{1-N}$ and POPs $122_{1-M}$ may be centrally controlled through a control station. Also, in one or more other embodiments, POPs $112_{1-N}$ and POPs $122_{1-M}$ may be controlled from distributed locations.

In one or more embodiments, a segment (e.g., segments $136_{1-B}$) may be a communication link between a POP and other POPs, as shown in FIG. 1. In an event of a POP failure (e.g., due to a network congestion, a service unavailability, a segment policy, etc.), cloud computing system 100 may switch coupling to a different POP. In case of there being an intermediate POP failure, an alternate route may be determined based on which the data (e.g., data 108) is re-routed.

In one or more embodiments, cloud computing system 100 may include a huge number of network entities whose current (or, historical) state may reflect the possibility (or, currency) of performance issues and/or failures for subscribers of the application acceleration as a service provided through cloud computing system 100. In one or more embodiments, features relevant to said huge number of network entities of cloud computing system 100 may be analyzed therethrough to determine change in patterns of data associated therewith.

Figure 3:
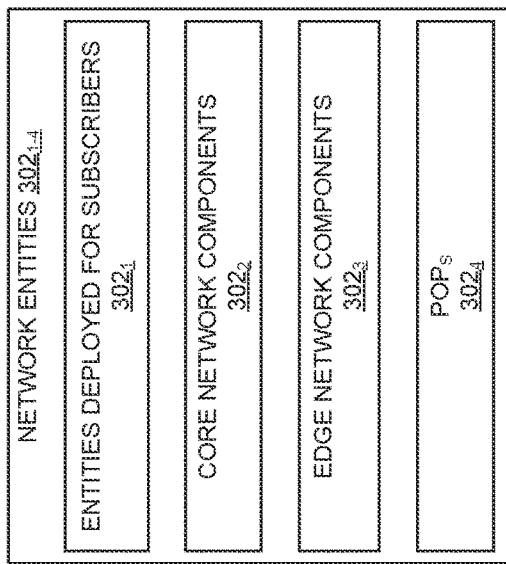
FIG. 3 is a list view of network entities in the cloud computing system of FIG. 1 and features associated therewith, according to one or more embodiments.
Figure 3:
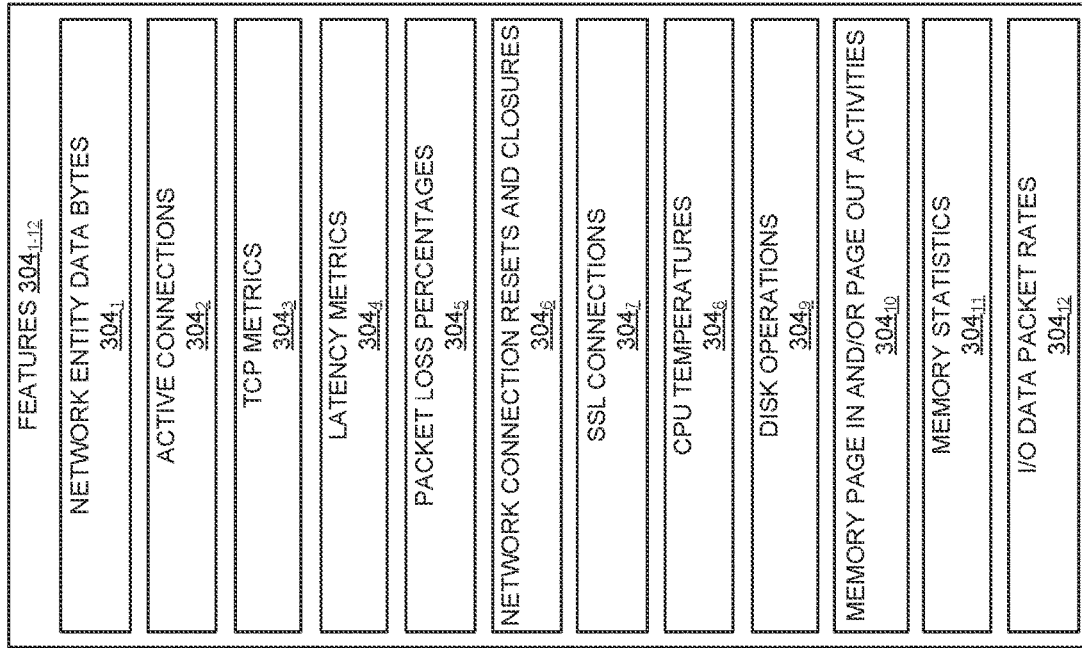

FIG. 3 lists network entities $302_{1-4}$ in cloud computing system 100 and features $304_{1-12}$ associated therewith, according to one or more embodiments. In one or more embodiments, network entities $302_{1-4}$ may include entities deployed for subscribers (e.g., users $180_{1-M}$ at client devices $104_{1-M}$) of all services provided through cloud computing system 100 including the application acceleration as a service discussed above; the aforementioned is shown in FIG. 3 as entities deployed for subscribers $302_1$.

In one or more embodiments, network entities $302_{1-4}$ may also include components (e.g., software, hardware) associated with (e.g., inside) core network 114 such as network bus/buses, routers, hub(s) and/or Network Access Points as core network components $302_2$, components (e.g., physical and virtual) placed at the peripheries (e.g., routers, the optional CPEs discussed above, Network Access Points, multiplexers, router switches) of core network 114, WANs $106_{1-N}$ and/or WANs $116_{1-M}$ as edge network components $302_3$, and POPs (e.g., POPs $112_{1-N}$ and POPs $122_{1-M}$) of nodes/machines in cloud computing system 100 as POPs $302_4$. Other forms of network entities are within the scope of the exemplary embodiments discussed herein.

In one or more embodiments, features $304_{1-12}$ relevant to network entities $302_{1-4}$ utilized for analyses may include but are not limited to:

(a) bytes (e.g., optimized and/or unoptimized bytes; while optimized data bytes may refer to data through optimized network connections, unoptimized data bytes may refer to data through unoptimized network connections) of data transferred or received from a network entity $302_{1-4}$; the aforementioned is shown in FIG. 3 as network entity data bytes $304_1$, (b) number of active connections (e.g., optimized and/or unoptimized network connections) from and/or to network entity $302_{1-4}$; the aforementioned is shown in FIG. 3 as active connections $304_2$, (c) Transmission Control Protocol (TCP) metrics $304_3$; in an example implementation of cloud computing system 100, POP-POP architecture thereof may include TCP proxies (e.g., at layer 4) at each segment (e.g., segment $136_{1-B}$), (d) latency metrics $304_4$, or, latency related to data communication (e.g., involving network entities $302_{1-4}$) across cloud computing system 100, (e) packet loss percentages $304_5$, or, percentage of packets related to data communication (e.g., involving network entities $302_{1-4}$) across cloud computing system 100 not reaching destination(s) thereof, (f) network connection resets and closures (e.g., through termination requests such as FINs) $304_6$, (g) SSL connections $304_7$ from and/or to network entity $302_{1-4}$, (h) Central Processing Unit (CPU) temperatures $304_8$ specific to machines within cloud computing system 100, (i) disk operations $304_9$ specific to machines within cloud computing system 100, (j) memory page in and/or page out activities $304_{10}$ specific to machines within cloud computing system 100, (k) memory statistics $304_{11}$ specific to machines within cloud computing system 100, and (l) Input/Ouput (I/O) data packet rate for each network entity $302_{1-4}$, as I/O data packet rates $304_{12}$.

In one or more embodiments, there may be tens of thousands of network entities (e.g., network entities $302_{1-4}$) in cloud computing system 100; thus, computational requirements involved in analyzing features $304_{1-12}$ in real-time may require large-scale processing through cloud computing system 100. In one or more embodiments, analyses for problematic data patterns may have to be performed on different network entities $302_{1-4}$, with each category of network entity $302_{1-4}$ (e.g., network entity $302_1$, network entity $302_2$, network entity $302_3$ etc.) having own sets of features $304_{1-12}$ associated therewith on which said analyses have to be done.

Exemplary embodiments discussed herein provide for a self-adaptable, fault tolerant and linearly scalable process to analyze performance issues and/or failures for subscribers (e.g., user(s) $180_{1-M}$ associated with client device(s) $104_{1-M}$) within cloud computing system 100 based on analyzing changes in patterns of data for each network entity $302_{1-4}$. For example, one network entity $302_{1-4}$ may have several features $304_{1-12}$ to account for in order to completely describe a state thereof. In one or more embodiments, the aforementioned analyses may be performed on the one or more features $304_{1-12}$ across time steps to determine one or more changes in the patterns of data.

Figure 4:
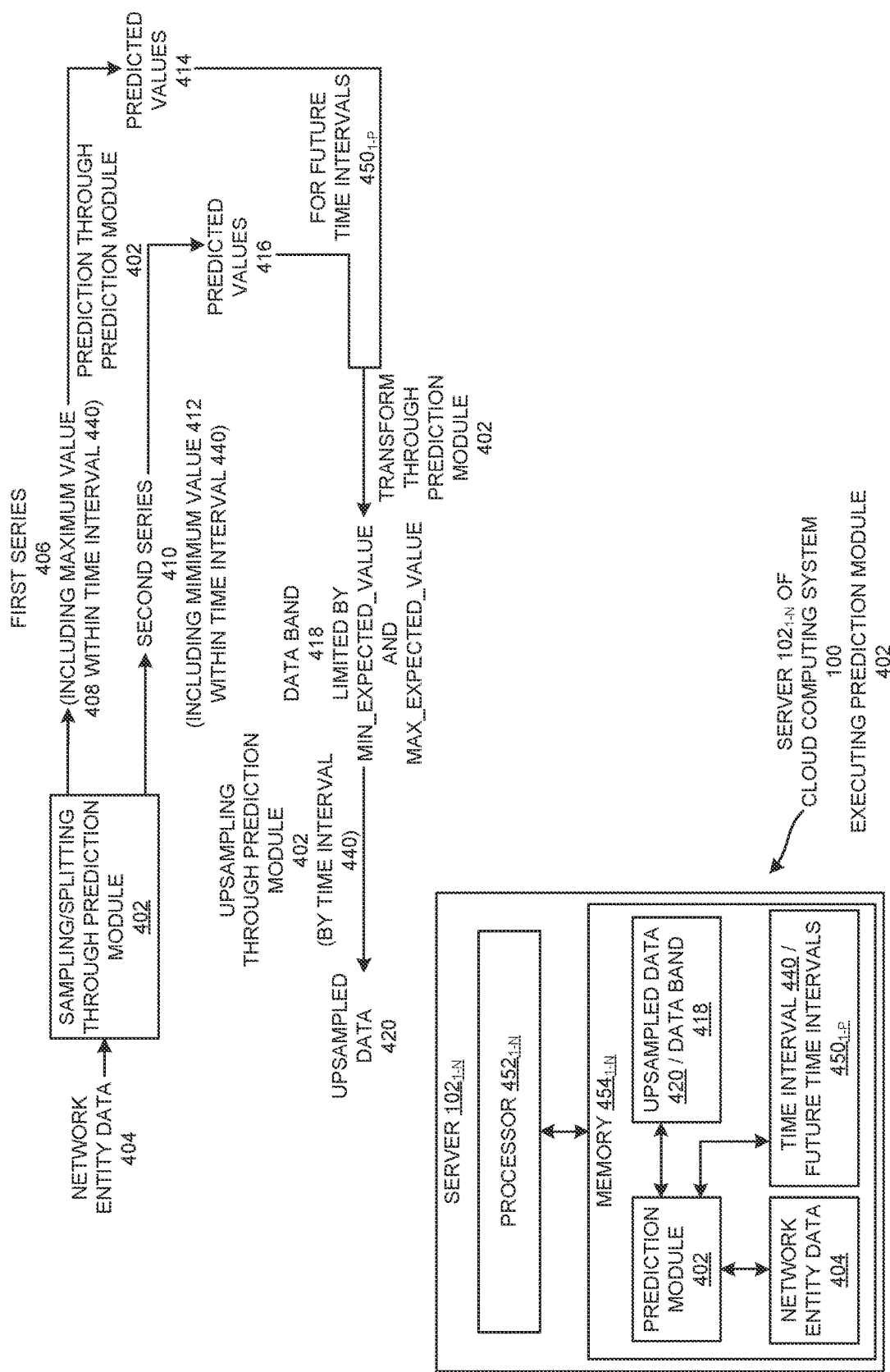
FIG. 4 is a schematic view of a prediction module configured to execute on a server of the cloud computing system of FIG. 1 and elements of data prediction thereof, according to one or more embodiments.

FIG. 4 shows a prediction module 402 (e.g., including multiple sets of instructions) executing on servers $102_{1-N}$ of cloud computing system 100, according to one or more embodiments. For illustrative purposes, FIG. 4 shows prediction module 402 executing on one server $102_{1-N}$. As discussed above, in cloud computing system 100, each network entity $302_{1-4}$ may generate data per unit of time (e.g., 1 minute), according to one or more embodiments. In one or more embodiments, said data may be collected at a central repository machine (e.g., server $102_{1-N}$ shown in FIG. 4). FIG. 4 shows server $102_{1-N}$ as including a processor $452_{1-N}$ (e.g., a CPU, a Graphics Processing Unit (GPU) and/or a microprocessor, a cluster of processors) communicatively coupled to a memory $454_{1-N}$ (e.g., volatile and/or non-volatile memory/storage, a number of memories including memories of different types).

FIG. 4 also shows prediction module 402 stored in memory $454_{1-N}$ and configured to execute on processor $452_{1-N}$; data associated with each network entity $302_{1-4}$ is shown as stored in memory $454_{1-N}$ as network entity data 404 and interfaced with prediction module 402; said network entity data 404 may be available for a long duration of time (e.g., 1 month, 3 days). In one or more embodiments, prediction module 402 may be configured to read network entity data 404 as a time series for each network entity $302_{1-4}$ for each feature $304_{1-12}$. In one or more embodiments, prediction module 402 may then sample network entity data 404 for the each feature $304_{1-12}$ into a smaller time interval (say, x minutes, compared to, say, 3 days; said smaller time interval may be predefined and/or preconfigured), and split network entity data 404 into two series of sampled data—a first series 406 including a maximum value 408 (or, one or more maximum values; first series 406 may include a set of maximum values of network entity data 404) of network entity data 404 for the each feature $304_{1-12}$ within the smaller time interval and a second series 410 including a minimum value 412 (or, one or more minimum values; second series 410 may include a set of minimum values of network entity data 404) of network entity data 404 for the each feature $304_{1-12}$ within the smaller time interval. It is quite easy to envision numbers (corresponding to maximum value 408 and minimum value 412) of network entity data 404 within the smaller time interval.

In one or more embodiments, first series 406 and second series 410 may be utilized by prediction module 402 to create two separate data models to forecast (e.g., predicted values 414 associated with first series 406, and predicted values 416 associated with second series 410) network entity data 404 for the each feature $304_{1-12}$ for future time intervals $450_{1-P}$. In one or more embodiments, prediction module 402 may combine predicted values 414 from first series 406 and predicted values 416 from second series 410 for each future time interval $450_{1-P}$ and transform said predicted values 414 and predicted values 416 into a data band 418, where a minimum of predicted values 416 is regarded as a minimum boundary value (or, min_expected_value) of data band 418 and a maximum of predicted values 414 is regarded as a maximum boundary value (or, max_expected_value) of data band 418.

In one or more embodiments, data band 418 may then be upsampled (or, extrapolated) by the smaller time interval (say, x minutes; FIG. 4 shows smaller time interval as time interval 440) discussed above via prediction module 402 to restore data granularity. In one example implementation, the aforementioned upsampling may be done by copying x data samples in one minute. In one or more embodiments, the result of the upsampling, viz. upsampled data 420, may be stored in memory $454_{1-N}$ (e.g., non-volatile storage).

Figure 5:
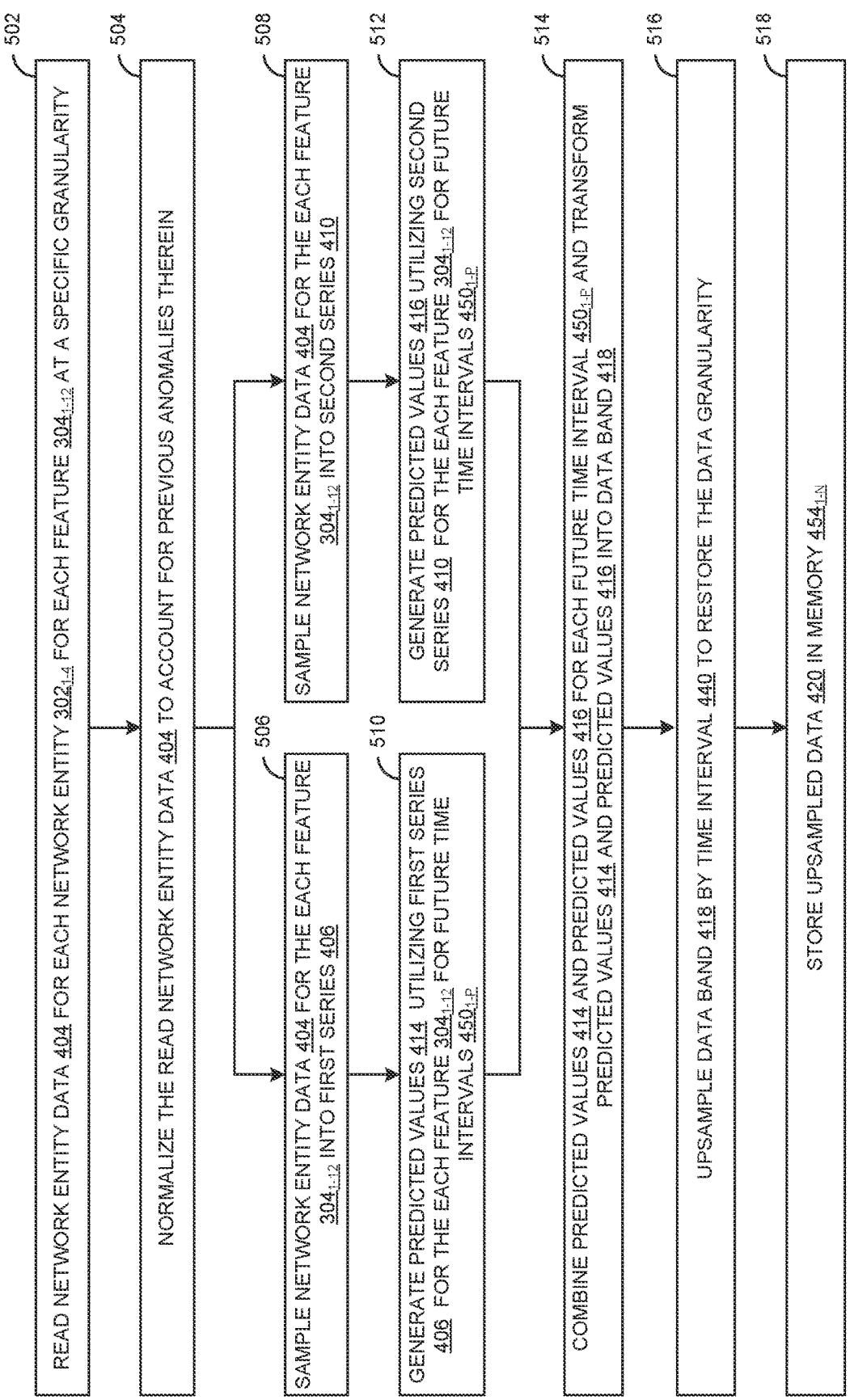
FIG. 5 is a process flow of the operations involved in the data prediction through the prediction module of FIG. 4, according to one or more embodiments.

FIG. 5 summarizes the operations involved in the above-mentioned data prediction, according to one or more embodiments. In one or more embodiments, operation 502 may involve reading, through prediction module 402, network entity data 404 as a time series for each network entity $302_{1-4}$ for each feature $304_{1-12}$ at a specific (e.g., predefined and/or preconfigured) granularity (e.g., 1 minute) from memory $454_{1-N}$. In one or more embodiments, operation 504 may involve normalizing, through prediction module 402, the read network entity data 404 to account for previous anomalies therein.

In one or more embodiments, the normalized read network entity data 404 may then be sampled by prediction module 402 for the each feature $304_{1-12}$ into a smaller time interval (say, x minutes; x, for example, can be 10 minutes); prediction module 402 may also split (the normalized read) network entity data 404 into two series of sampled data—first series 406 and second series 410, both within time interval 440, as discussed above. The aforementioned operations are detailed under two distinct chains: operation 506 involving sampling (the normalized read) network entity data 404 for the each feature 304$_{1-12}$ into first series 406 and operation 508 involving sampling (the normalized read) network entity data 404 for the each feature 304$_{1-12}$ into second series 410 are shown as two distinct operations.

In one or more embodiments, operation 510 may involve prediction module 402 utilizing first series 406 to generate a first data model (e.g., predicted values 414) to forecast network entity data 404 for the each feature 304$_{1-12}$ for future time intervals 450$_{1-P}$. For the aforementioned purpose, in one example implementation, prediction module 402 may implement one or more forecasting and/or predictive algorithms (e.g., exponential smoothing algorithm(s) such as algorithms based on triple exponential smoothing) on first series 406 to create predicted values 414. Similarly, in one or more embodiments, operation 512 may involve prediction module 402 utilizing second series 410 to generate a second data model (e.g., predicted values 416) to forecast network entity data 404 for the each feature 304$_{1-12}$ for future time intervals 450$_{1-P}$. Again, for the aforementioned purpose, prediction module 402 may utilize the one or more forecasting and/or predictive algorithms.

In one or more embodiments, operation 514 may involve prediction module 402 combining predicted values 414 from first series 406 and predicted values 416 from second series 410 for each future time interval 450$_{1-P}$ and transform said predicted values 414 and predicted values 416 into data band 418 discussed above. In one or more embodiments, as part of the combination of operation 514, a minimum of predicted values 416 may be regarded as min_expected_value of data band 418 and a maximum of predicted values 414 may be regarded as max_expected_value of data band 418.

In one or more embodiments, operation 516 may involve upsampling data band 418 by time interval 440 via prediction module 402 to restore the data granularity. In one or more embodiments, operation 518 may then involve storing upsampled data 420 in memory 454$_{1-N}$ (e.g., persistent/non-volatile storage). It can be understood that data band 418 or upsampled data 420 may be utilized in detection of anomalies in network entity data 404 collected in real-time.

Figure 6:
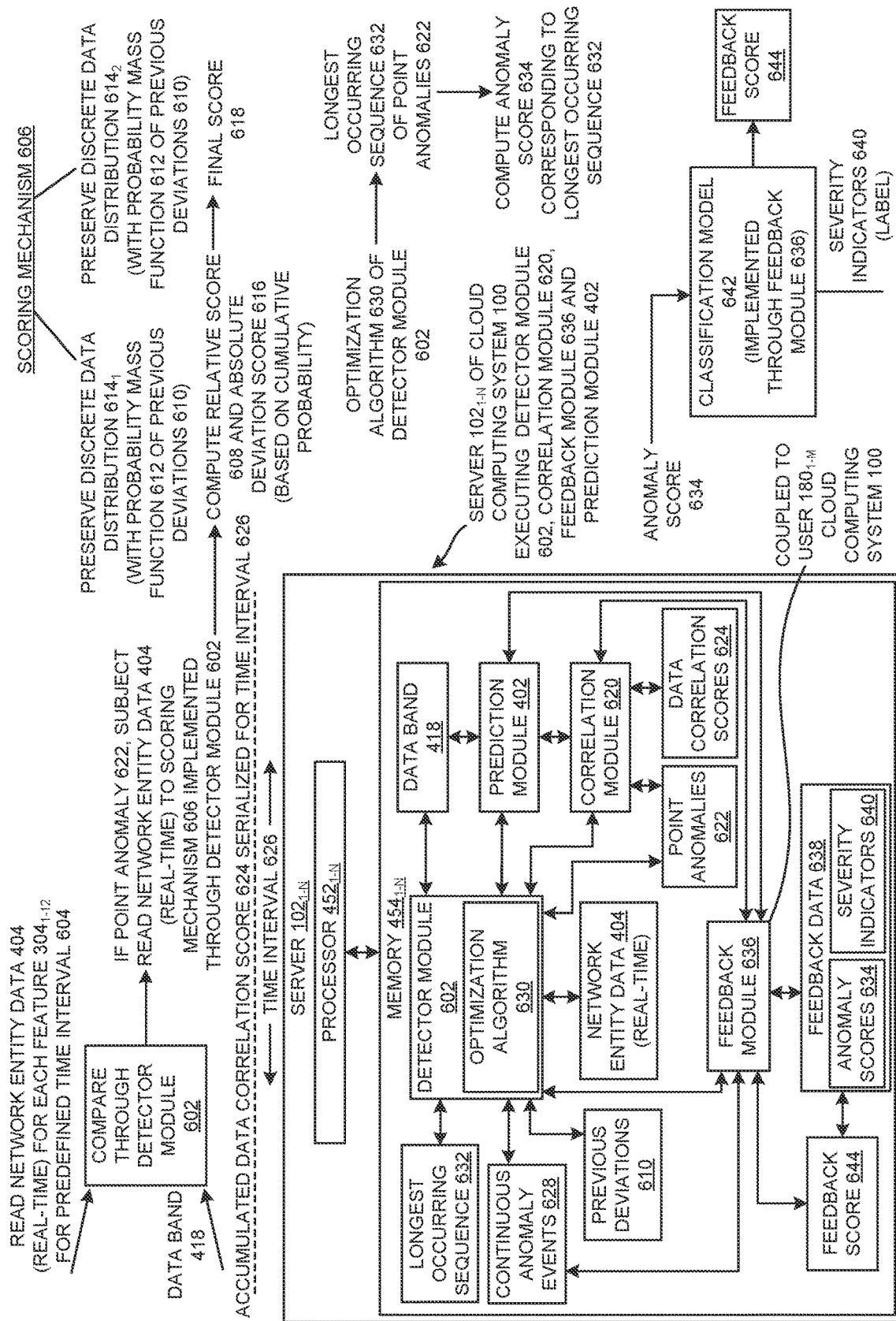
FIG. 6 is a schematic view of a detector module, a correlation module and a feedback module configured to execute on the server of the cloud computing system of FIGS. 1 and 4 and elements of functionalities thereof, according to one or more embodiments.

FIG. 6 shows a detector module 602 executing on servers 102$_{1-N}$ of cloud computing system 100, according to one or more embodiments. For illustrative purposes, FIG. 6 shows detector module 602 executing on the same one server 102$_{1-N}$ as prediction module 402 and communicatively coupled thereto. Again, in one or more embodiments, detector module 602 may be stored in memory 454$_{1-N}$ and configured to execute on processor 452$_{1-N}$. It should be noted that implementations where detector module 602 is executed on one or more server(s) 102$_{1-N}$ different from the one server 102$_{1-N}$ executing prediction module 402 and distributed implementations of detector module 602 and prediction module 402 across cloud computing system 100 are within the scope of the exemplary embodiments discussed herein.

In one or more embodiments, detector module 602 may be configured to read network entity data 404 in real-time. In one or more embodiments, for every unit of time (e.g., 1 minute; can be predefined and/or preconfigured), detector module 602 may read network entity data 404 for the each feature 304$_{1-12}$ for a predefined time interval 604 shown in FIG. 6. In one or more embodiments, detector module 602 may then compare read network entity data 404 with data band 418 (or, upsampled data 420). In one or more embodiments, if the value of network entity data 404 is determined to be outside data band 418, detector module 602 may implement a sequence of operations to test whether said value is an anomaly. In one or more embodiments, once the aforementioned sequence of operations confirms that the value is a true anomaly (or, point anomaly), read network entity data 404 may be subjected to a scoring mechanism 606 (e.g., implemented through detector module 602) that computes a score to describe anomalousness of said value.

In one or more embodiments, in accordance with scoring mechanism 606, detector module 602 may compute a combination of a relative score 608 and a deviation score for the abovementioned value. In one or more embodiments, relative score 608 may be computed as:

$$\text{relative score} = \min\left(1, \frac{(\text{input} - \text{base})}{\text{base}}\right), \quad (1)$$

where min represents the minimum function that returns the smaller of two values, viz. 1 and $$\frac{\text{input} - \text{base}}{\text{base}},$$

input represents the above value of real-time network entity data 404 to be compared with data band 418 (or, upsampled data 420), base is min_expected_value of data band 418 discussed above if input is lower than min_expected_value, and base is max_expected_value of data band 418 discussed above if input is higher than max_expected_value.

In one or more embodiments, in accordance with scoring mechanism 606, the deviation score for current network entity data 404 for each feature 304$_{1-12}$ may be computed based on previous deviations 610 thereof from data bands analogous to data band 418 (e.g., in effect, in a temporal future, data band 418 may form an element in a data set of a history of data bands). In one or more embodiments, previous deviations 610 from the data bands analogous to data band 418 may be preserved in memory 454$_{1-N}$ (e.g., in one or more rolling cache(s)). In one or more embodiments, scoring mechanism 606, as implemented through detector module 602, may preserve two discrete data distributions (e.g., discrete data distribution 614$_1$ and discrete data distribution 614$_2$) with a given probability mass function 612 of previous deviations 610 from the data bands analogous to data band 418.

In one or more embodiments, the abovementioned two discrete data distributions may be preserved for each network entity 30214 for each feature 304$_{1-12}$. In one or more embodiments, one discrete data distribution 614$_1$ may be preserved for point anomalies whose values are higher than max_expected_value discussed above and another discrete data distribution 614$_2$ may be preserved for point anomalies whose values are lower than min_expected_value. Here, in one or more embodiments, discrete data distribution 614$_1$ and discrete data distribution 614$_2$ may utilize previous deviations 610 that are absolute deviations from the data bands analogous to data band 418 for corresponding point anomalies.

In one or more embodiments, for a newly determined point anomaly based on network entity data 404 read, scoring mechanism 606 may chose discrete data distribution 614$_1$ or discrete data distribution 614$_2$ based on value of said network entity data 404 read and compute a cumulative probability utilizing a value of deviation of said point anomaly from data band 418. In one or more embodiments, the aforementioned cumulative probability may be regarded as an absolute deviation score 616.

In one or more embodiments, the final score (e.g., final score 618) for the point anomaly may be expressed as:

$$\text{final score} = \text{sign} \times (\text{relative score} + \text{absolute deviation score}), \quad (2)$$

where sign=1, if input discussed above with regard to Equation (1) is higher than max_expected_value and sign=−1, if input discussed above with regard to Equation (1) is lower than min_expected_value.

FIG. 6 also shows a correlation module 620 communicatively coupled to detector module 602 (and, optionally, prediction module 402), according to one or more embodiments. Again, in one or more embodiments, correlation module 620 may be stored in memory 454$_{1-N}$ and configured to execute on processor 452$_{1-N}$ to realize operations associated therewith; again, the aforementioned modules may be distributed across servers 102$_{1-N}$ of cloud computing system 100, in some embodiments. In one or more embodiments, correlation module 620 may determine commonness of a pattern of continuous anomalies. In one or more embodiments, point anomalies (e.g., point anomalies 622) discussed above may be fed into correlation module 620, which organizes point anomalies 622 for each network entity 302$_{1-4}$ into a full mesh Q node graph, Q being the number of features (e.g., one or more of features 304$_{1-2}$) applicable to the each network entity 302$_{1-4}$; it is obvious that one network entity 302$_{1-4}$ may be associated with more features than another network entity 302$_{1-4}$. It is known to one skilled in the art that a full mesh graph may be a complete graph where every node is connected to every other node.

In one or more embodiments, a data correlation score 624 may be accumulated and updated by correlation module 620 for every determination of a point anomaly 622. In one or more embodiments, correlation module 620 may enable accumulation of data correlation scores 624 for a sliding window of a large time interval 626 (e.g., L weeks); said data correlation scores 624 may also be serialized for time interval 626. In one or more embodiments, correlation module 620 may keep track of a total number of point anomalies 622 determined for each network entity 302$_{1-4}$, and a count of point anomalies 622 determined for each feature 304$_{1-12}$ applicable thereto. In one or more embodiments, data correlation scores 624 may be stored in memory 454$_{1-N}$ (e.g., persistent storage).

In one or more embodiments, a separate asynchronous process executing periodically may be assigned (e.g., through detector module 602) to crawl (or, scan) through all point anomalies 622 and determine a continuous anomaly event 628 that can be considered as signifying a data pattern change. In one or more embodiments, for each network entity 302$_{1-4}$, detector module 602 may implement an optimization algorithm 630 (e.g., stored in memory 454$_{1-N}$ and configured to execute through processor 452$_{1-N}$) utilizing one or more dynamic programming technique(s) (e.g., recursion) to find a longest occurring sequence 632 of point anomalies 622 among all features 304$_{1-12}$ of each network entity 302$_{1-4}$ that is capable of being interleaved for a duration up to R minutes.

In one or more embodiments, an optimal sub-solution for longest occurring sequence 632 may be stored in memory 454$_{1-N}$ (e.g., a cache), and every subsequent iteration starting from the first may utilize a previous optimal sub-solution for longest occurring sequence 632 to generate a new longest occurring sequence 632. In one or more embodiments, in the process, detector module 602 may filter out sequences smaller than a predefined and/or preconfigured threshold by auto-ignoring short-lived (e.g., duration below another threshold) anomaly events. In one or more embodiments, detector module 602 may also compute an anomaly score 634 for each feature 304$_{1-12}$ corresponding to longest occurring sequence 632 based on summing up the number of point anomalies 622 of longest occurring sequence 632 for the each feature 304$_{1-12}$ and dividing said sum by a duration of longest occurring sequence 632. In one or more embodiments, detector module 602 may determine that a point anomaly 622 is occurring currently (or, in real-time) and is part of the determined continuous anomaly event 628; detector module 602 may then store the actively occurring continuous anomaly event 628 in memory 454$_{1-N}$ (e.g., into a separate table in a database).

FIG. 6 also shows a feedback module 636 configured to collect feedback (e.g., forming at least a part of feedback data 638) from an end user (e.g., a user 180$_{1-M}$ on a client device 104$_{1-M}$) on one or more continuous anomaly events 628 reported thereto. Again, feedback module 636 is shown stored in memory 454$_{1-N}$; feedback module 636 is configured to execute on processor 452$_{1-N}$; in some embodiments, the modules may be distributed across cloud computing system 100. FIG. 6 also shows feedback data 638 associated with feedback module 636. In one or more embodiments, feedback data 638 for an event (e.g., continuous anomaly event 628) may include anomaly score 634 thereof, along with a severity indicator 640 associated therewith; as seen above, at least a part of feedback data 638 may be constituted based on input(s) from the end user.

In one or more embodiments, feedback module 636 may utilize feedback data 638 to generate a classification model 642 that takes anomaly scores 634 of features 304$_{1-12}$ for an event (e.g., continuous anomaly event 628) as inputs thereto. In one or more embodiments, classification model 642 may consider a severity indicator 640 as a label of the event. In one example implementation, feedback module 636 may determine severity indicator 640 based on self-analyses and/or feedback from end users (e.g., users 180$_{1-M}$ on client device(s) 104$_{1-M}$) in accordance with some form of priority event(s) (e.g., potentially disruptive to one or more end user(s)) to be taken care of.

In the above implementation, severity indicators 640 may be grouped under four categories, for example, "Not a Problem," "Low," "Medium," and "High." Relevant values may be assigned to each these four categories. A typical range of values used to define severity indicators 640 may be 0-1. For example, "Not a Problem" may be mapped to a 0.25, "Low" to a 0.5, "Medium" to a 0.75 and "High" to a 1. Here, the choice of values used to define severity indicators 640 may depend on the process of handling high severity scenarios (e.g., by boosting one or more anomaly scores 634) and/or suppressing false positives. In one or more embodiments, boosting anomaly scores 634 may be a technique to improve confidence level(s) of severity predictions as the collected data (e.g., based on network entity data 404 for all features 304$_{1-12}$) grows; in other words, boosting anomaly scores 634 may impact severity predictions of events.

In one or more embodiments, classification model 642 may define different mappings of severity indicators 640 to applicable anomaly scores 634 for different sizes of data (e.g., based on network entity data 404). In one or more embodiments, classification model 642 may generate a feedback score 644 based on the aforementioned mapping;

said feedback score 644 is stored in memory $454_{1-N}$ (e.g., a data store) along with the associated event (e.g., continuous anomaly event 628).

Figure 7:
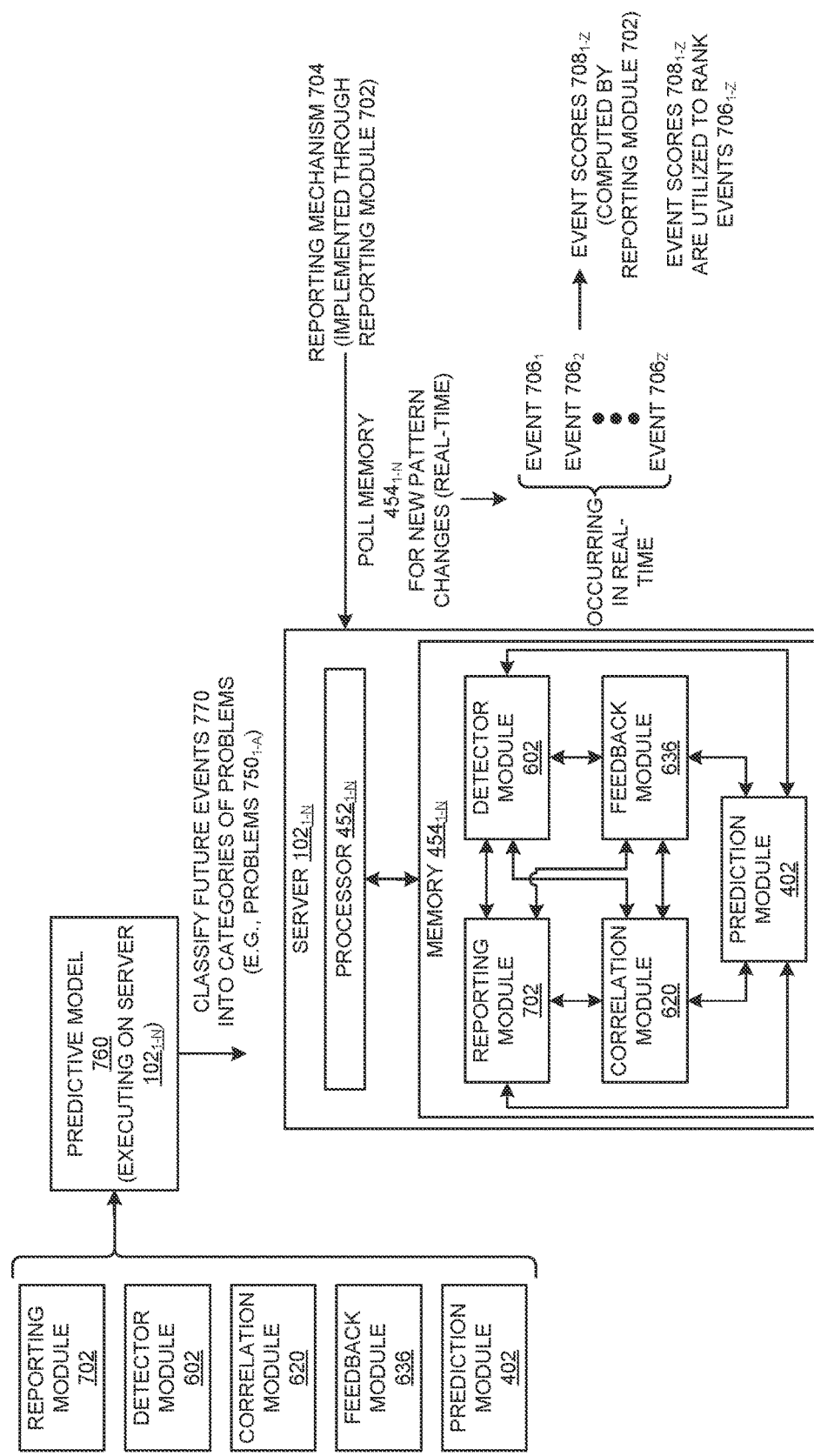
FIG. 7 is a schematic view of a reporting module configured to execute on the server of the cloud computing system of FIGS. 1, 4 and 6 and elements of functionalities thereof, according to one or more embodiments.

In one or more embodiments, data pattern changes as reflected through continuous anomaly events 628, for example, may be reported to a user (e.g., a network user such as a cloud administrator, a subscriber (e.g., a user $180_{1-M}$) at a client device $104_{1-M}$) of cloud computing system 100. FIG. 7 shows a reporting module 702 executing on servers $102_{1-N}$, according to one or more embodiments. In one or more embodiments, reporting module 702 may be communicatively coupled to each of feedback module 636, correlation module 620, detector module 602 and prediction module 402. Again, in one or more embodiments, reporting module 702 may be stored in memory $454_{1-N}$; instructions associated therewith may be configured to execute on processor $452_{1-N}$; again, the aforementioned modules may be distributed across server(s) $102_{1-N}$ of cloud computing system 100.

In one or more embodiments, the abovementioned determined pattern changes may be reported to one or more user(s) (e.g., a network user such as a cloud administrator, subscriber(s) (e.g., user(s) $180_{1-M}$) at client device(s) $104_{1-M}$) of cloud computing system 100 in accordance with a reporting mechanism 704 implemented through reporting module 702. In one or more embodiments, reporting mechanism 704 may poll memory $454_{1-N}$ for new pattern changes occurring in real-time. In one or more embodiments, reporting mechanism 704 may filter out any event with a low (e.g., below a predefined and/or preconfigured threshold) data correlation score 624, and apply a ranking on all events occurring in real-time. FIG. 7 shows events $706_{1-Z}$ occurring in real-time. In one or more embodiments, an event score $708_{1-Z}$ for an event $706_{1-Z}$ may be computed by reporting module 702 by summing individual anomaly scores 634 for all features $304_{1-12}$ and weighting the sum with respect to feedback score 644 stored in memory $454_{1-N}$. In one or more embodiments, the abovementioned ranking may be based on an order (e.g., decreasing, increasing) of event scores $708_{1-Z}$.

As discussed above, event score $708_{1-Z}$ may be expressed as:

$$\text{event score} = \Sigma_{all\ feathers} \text{abs(anomaly score)} \times \text{feedback score}, \quad (3)$$

where abs is a function that returns the absolute value of the argument thereof; here, abs(anomaly score) may return the absolute value or magnitude of the corresponding anomaly score 634.

In one or more embodiments, reporting module 702 may also capture feedback from the user, analogous to feedback module 636. As discussed above, in one or more embodiments, the feedback may be used to further improve event scoring (e.g., computing event score $708_{1-Z}$) by predicting severity thereof or a pattern change associated therewith. In one or more embodiments, the aforementioned feedback may also be utilized to classify events (e.g., events $706_{1-Z}$) into categories and tag analyses of one or more events as valuable high level diagnoses of data pattern change(s) associated therewith. In one or more embodiments, in accordance therewith, reporting mechanism 704 may utilize anomaly scores 634 for each event $706_{1-Z}$ as inputs to a classification model analogous to classification model 642 implemented therethrough, with each feature $304_{1-12}$ becoming a dimension of the inputs.

In one or more embodiments, categories (e.g., through analogous severity indicators 640) of the each event $706_{1-Z}$ given as feedback may be used as the label thereof. In one or more embodiments, the models discussed above and implemented through prediction module 402, detector module 602, correlation module 620, feedback module 636 and reporting module 702 may, thus, provide for a predictive model 760 to classify future events 770 analogous to events $706_{1-Z}$ into categories of problems (e.g., problems $750_{1-A}$ based on anomalous data patterns (and, feedback score 644, event scores $708_{1-Z}$) discussed above).

In one or more embodiments, the sampling of network entity data 404 for the each feature $304_{1-12}$ discussed above into a smaller time interval and splitting of network entity data 404 into two series of sampled data enable detecting events $706_{1-Z}$ through the modules implemented in one or more server(s) $102_{1-N}$ much faster compared to a detection process involving no sampling and splitting. In one or more embodiments, this may provide for a faster and more efficient predictive model to classify future events. Additionally, in one or more embodiments, storage footprints associated with the new processes discussed above may be less compared to traditional detection of anomalies in network entity data 404.

It should be noted that instructions associated with prediction module 402, detector module 602, correlation module 620, feedback module 636 and reporting module 702 discussed above may be tangibly embodied on a non-transitory medium (e.g., a Compact Disc (CD), a Digital Video Disc (DVD), a hard disk/drive, a Blu-ray disc™) readable through a data processing device (e.g., a server $102_{1-N}$). All reasonable variations are within the scope of the exemplary embodiments discussed herein.

Figure 8:
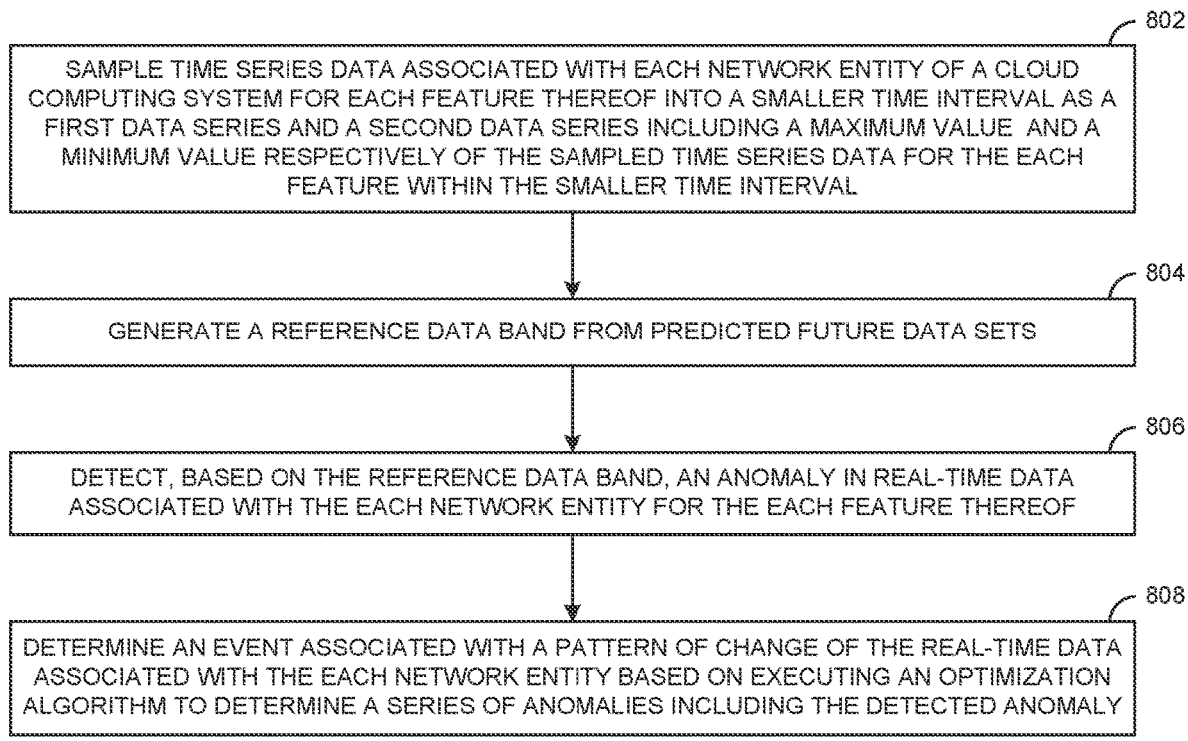
FIG. 8 is a process flow diagram detailing the operations involved in efficient detection and prediction of data pattern changes in the cloud computing system of FIGS. 1, 4, 6 and 7, according to one or more embodiments.

FIG. 8 shows a process flow diagram detailing the operations involved in efficient detection and prediction of data pattern changes in a cloud-based application acceleration as a service environment (e.g., cloud computing system 100), according to one or more embodiments. In one or more embodiments, operation 802 may involve sampling, through a server (e.g., one or more server(s) $102_{1-N}$) of cloud computing system 100 including a number of subscribers (e.g., users $180_{1-M}$) of the application acceleration as a service provided by cloud computing system 100 at a corresponding number of client devices (e.g., client devices $104_{1-M}$) communicatively coupled to the server, time series data (e.g., network entity data 404) associated with each network entity (e.g., network entity $302_{1-4}$) of a number of network entities (e.g., network entities 30214) of cloud computing system 100 for each feature (e.g., feature $304_{1-12}$) thereof into a smaller time interval (e.g., time interval 440) compared to that of the time series data as a first data series (e.g., first series 406) including a maximum value (e.g., maximum value 408) of the sampled time series data for the each feature within the smaller time interval and a second data series (e.g., second series 410) including a minimum value (e.g., minimum value 412) of the sampled time series data for the each feature within the smaller time interval.

In one or more embodiments, operation 804 may involve generating, through the server, a reference data band (e.g., data band 418) based on predicting a first future data set (e.g., predicted values 414) of the each network entity for the each feature based on the first data series and a second future data set (e.g., predicted values 416) of the each network entity for the each feature based on the second data series, combining the first future data set and the second future data set for each future time interval (e.g., time interval $450_{1-P}$) thereof, and transforming the combined first future data set and the second future data set for the each future time interval into the reference data band.

In one or more embodiments, based on regarding a maximum of the first future data set as a maximum expected value (max_expected_value) of the reference data band and a minimum of the second future data set as a minimum expected value (min_expected_value) of the reference data band, operation 806 may involve detecting, through the server, one or more anomalies (e.g., point anomalies 622) in real-time data (e.g., network entity data 404) associated with the each network entity for the each feature thereof based on determining whether the real-time data falls outside the maximum expected value and the minimum expected value of the reference data band.

In one or more embodiments, operation 808 may then involve determining, through the server, an event (e.g., continuous anomaly event 628, event $706_{1-Z}$) associated with a pattern of change of the real-time data associated with the each network entity based on executing an optimization algorithm (e.g., optimization algorithm 630) to determine, among all features of the each network entity, a series of anomalies including the detected one or more anomalies that constitutes a sequence of patterned anomalies in accordance with scanning detected anomalies associated with the real-time data associated with the each network entity including the detected one or more anomalies.

Referring back to FIG. 6 and the discussion associated therewith, correlation module 620 may help determine commonness of a pattern of continuous anomalies by providing intuition thereof. In one or more embodiments, the "pattern," as discussed herein, may refer to the combinations (or, one or more combination(s)) of features $304_{1-12}$ that have led to an event (e.g., a continuous anomaly event 628) or a continuous sequence of point anomalies 622. In one or more embodiments, anomaly information (e.g., point anomaly 622) for each network entity $302_{1-4}$ for one or more features $304_{1-12}$ associated therewith may be held (e.g., through correlation module 620) in a full mesh Q node graph, where Q signifies the number of features (e.g., one or more of features $304_{1-12}$) applicable to the each network entity $302_{1-4}$. In one or more embodiments, data correlation score 624 corresponding thereto may be accumulated and updated for every report of new anomaly associated with the one or more features $304_{1-12}$. It should be noted that, in one or more embodiments, data correlation score 624 may also be updated for every report of an anomaly in the one or more features $304_{1-12}$ changing state thereof into a non-anomaly.

Thus, in one or more embodiments, detector module 602 may merely need to look up values of current data correlation scores 624 without the requirement of performing additional operations therefor. In one or more embodiments, the scoring mechanism may hold score information (e.g., data correlation scores 624 in memory $454_{1-N}$) for a sliding window of a large time interval 626 (e.g., L weeks, 1 week), as discussed above. In one or more embodiments, correlation module 620 may also serialize graph snapshots into memory $454_{1-N}$ (e.g., disk) in the form of a Q×Q matrix. In one or more embodiments, this may enable graph building on restart of the pattern commonness determination process. In one or more embodiments, the mechanism may keep track of a total number of point anomalies 622 reported for each network entity $302_{1-4}$ and a count of point anomalies 622 associated with a feature $304_{1-12}$.

Figure 9:
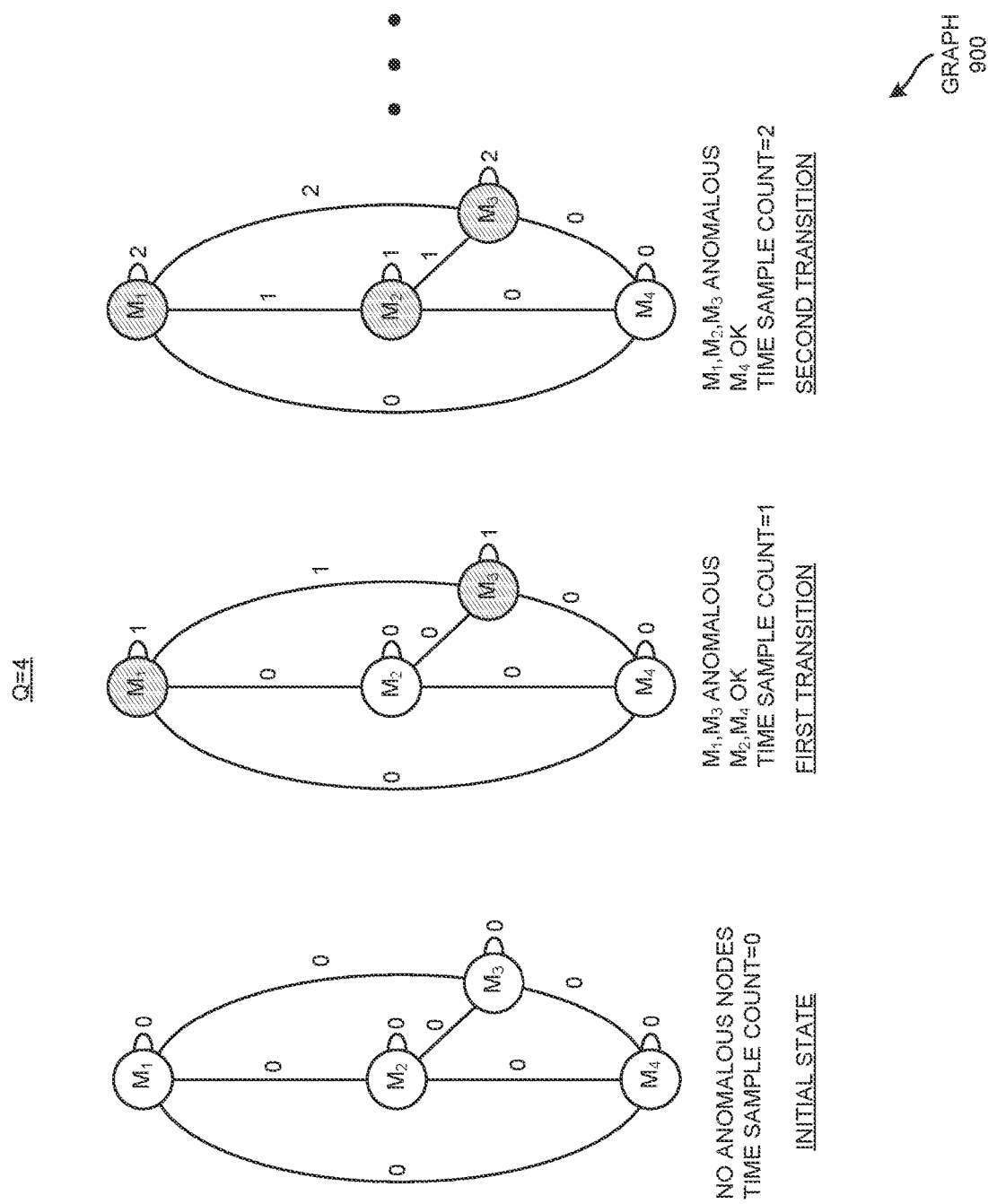
FIG. 9 is an illustrative view of a graph representation of a point anomaly associated with a network entity and transitions occurring therein when new anomalies are added thereto in an example implementation through the cloud computing system of FIGS. 1, 4, 6 and 7.

FIG. 9 illustrates an example graph 900 representing a point anomaly 622 associated with a network entity $302_{1-4}$ having features $304_{1-Q}$ associated therewith and transitions occurring therein when new anomalies associated with features $304_{1-Q}$ are added thereto. For example purposes, graph 900 may be constituted by 4 nodes (Q=4) $M_1$-$M_4$, where each of $M_1$-$M_4$ is a feature $304_{1-4}$ (note that Q can be anything, so there may be more than 4 or even more than 12 features to account for). $M_1$-$M_4$ may be associated with metrics discussed above. Thus, each node $M_1$-$M_4$ of graph 900 may represent a feature $304_{1-Q}$. An edge of graph 900 may represent a weight (e.g., a count). Point anomaly 622 may be monitored periodically (e.g., after every time interval T) through graph 900 and every time interval elapsing after an initial state may be counted as a time sample. The count of the number of time samples may also be monitored.

As shown in the initial state (time t=0), the time sample count may be 0. As part of a first transition (time t=T), $M_1$ and $M_3$ may be anomalous (e.g., associated with point anomaly 622). This may cause the weight of each pair of features affected thereby ($M_1$-$M_3$) including self-pairs ($M_1$-$M_1$ and $M_3$-$M_3$) to be updated by 1, as shown in FIG. 9. The total number of pairs of features $304_{1-Q}$ affected may be $^2C_1 + ^2C_2 = 3$. Now, as this is the first sample, the time sample count may be updated to 1. Over time, as part of a second transition (time t=2T) from the first transition, $M_2$ may be newly anomalous. $M_1$ and $M_3$ may remain anomalous. The aforementioned transition may be tracked through graph 900 by the weight of each pair of features ($M_1$-$M_2$, $M_2$-$M_3$ and $M_1$-$M_3$) affected thereby including self-pairs ($M_1$-$M_1$, $M_2$-$M_2$ and $M_3$-$M_3$) being updated by 1, as shown in FIG. 9.

The total number of pairs of features $304_1$-Q affected may be $^3C_1 + ^3C_2 = 3 + 3 = 6$. As this is the second transition, the time sample count may be updated to 2. It should be noted that if, for example, $M_2$ is non-anomalous in the third transition (not shown), the weight of each pair corresponding to $M_2$ may not be updated and may stay the same. $M_2$ may then be excluded from the nodes of graph 900 being accounted for in the calculation of a current data correlation score 624. Thus, the transitions across a large number of samples may be averaged through correlation module 620 to obtain the current data correlation score 624 of point anomaly 622 as:

$$CS = \sum_{i=1}^{APC} \frac{\left(1 - \frac{EWP_i}{TSAC}\right)}{APC}, \quad (4)$$

where CS may be the current data correlation score 624, APC may be the count of the total number of pairs of Y current anomalous features out of the features $304_{1-Q}$ ($M_1$-$M_4$ or $304_{1-4}$), which may be given by $^YC_2 + ^YC_1$ for graph 900, where Y (<Q) is the number of features currently having anomalies associated therewith, $EWP_i$ may be the edge weight of the $i^{th}$ pair of the Y current anomalous features and TSAC may be the total number of time samples (or, count of the number of time samples). It should be noted that $EWP_i$<TSAC. In one or more embodiments, data correlation scores 624 may be employed in reporting mechanism 704 implemented through reporting module 702, and factored into computation of event score(s) $708_{1-Z}$ discussed above.

In one or more embodiments, data correlation score 624 for every point anomaly 622 may be updated over time as seen in the equation (4) above. In one or more embodiments, by assigning a (current) data correlation score 624 to a point anomaly 622, a commonness of a combination of the anomalous features (e.g., Y features) contributing to point anomaly 622 associated with the each network entity $302_{1-4}$ with respect to an equivalent combination of the anomalous features contributing to another previously detected point anomaly 622 associated with the each network entity $302_{1-4}$ may be indicated by way of the current data correlation score 624. It should be noted that several graphs 900 pertaining to point anomalies 622 may be represented and analyzed through correlation module 620.

It should be noted that transitions associated with both new anomalies and changes of existing anomalies into non-anomalies may be captured through graph 900. In one or more embodiments, when a continuous anomaly event 628 occurs, detector module 602 may check for scores (e.g., anomaly scores 634, data correlation scores 624) for the combination of features 304$_{1-12}$ (or 304$_{1-4}$) leading to continuous anomaly event 628. In one or more embodiments, scoring mechanism 606 implemented through detector module 602 may also compute a probability for each possible combination of features 304$_{1-12}$ (or, 304$_{1-4}$) leading to continuous anomaly event 628. In one or more embodiments, the reversal of the probability may provide an intuition as to how uncommon the sequence of point anomalies 622 is. In one or more embodiments, the probabilities of all combinations of features 304$_{1-12}$ (or 304$_{1-4}$) leading to continuous anomaly event 628 may be averaged to obtain a score value that may be stored (e.g., in persistent memory 454$_{1-N}$) against the corresponding continuous anomaly event 628.

Figure 10:
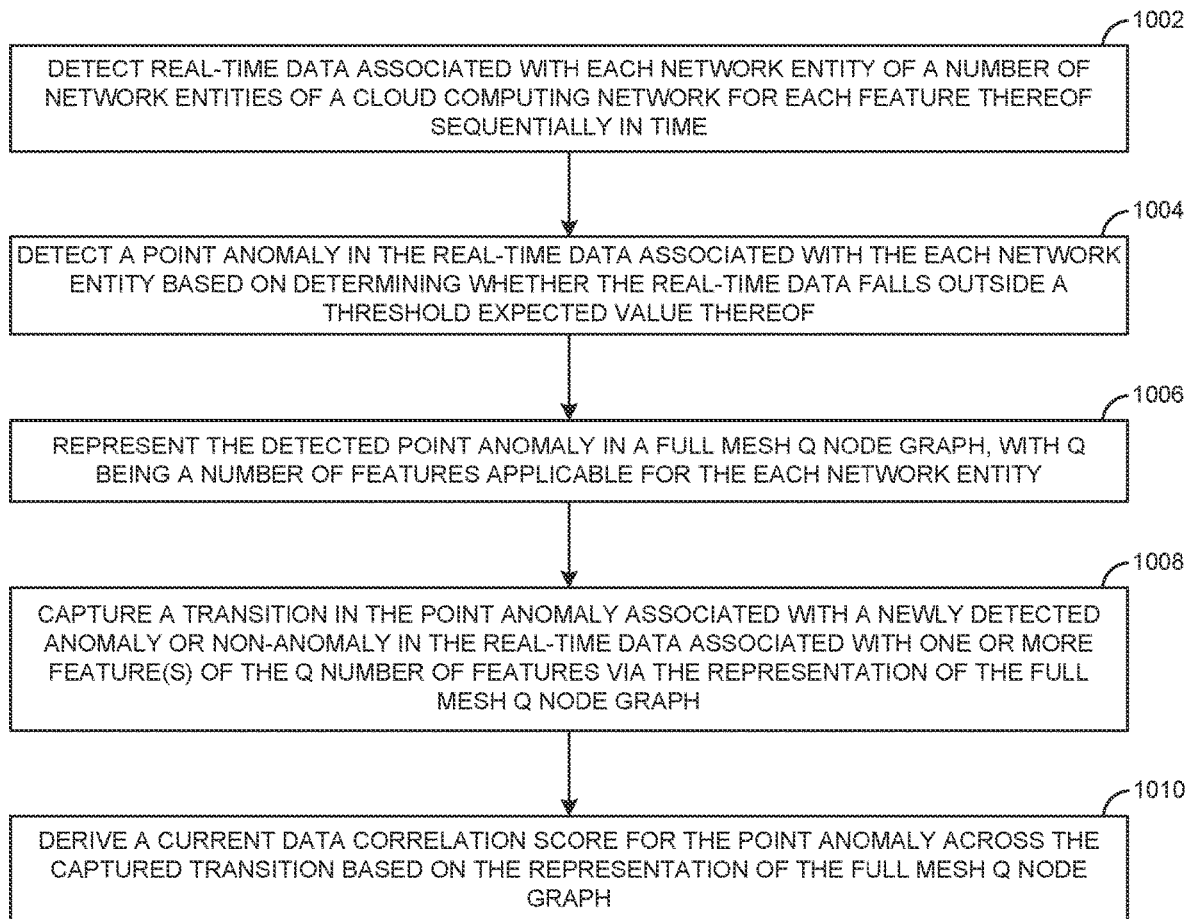
FIG. 10 shows a process flow diagram detailing the operations involved in realizing correlation score based commonness indication associated with a point anomaly pertinent to data pattern changes in the cloud computing system of FIGS. 1, 4, 6 and 7, according to one or more embodiments.

FIG. 10 is a process flow diagram detailing the operations involved in realizing correlation score (e.g., data correlation score 624) based commonness indication associated with a point anomaly (e.g., point anomaly 622) pertinent to data pattern changes in cloud computing system 100 of FIGS. 1, 4, 6 and 7, according to one or more embodiments. In one or more embodiments, operation 1002 may involve detecting, through a server (e.g., one or more server(s) 102$_{1-N}$; or, a data processing device in general) of a cloud computing network (e.g., cloud computing system 100) including a number of subscribers (e.g., users 180$_{1-M}$) of application acceleration as a service provided by the cloud computing network at a corresponding number of client devices (e.g., client devices 104$_{1-M}$) communicatively coupled to the server, real-time data (e.g., network entity data 404) associated with each network entity of a number of network entities (e.g., network entities 302$_{1-4}$) of the cloud computing network for each feature thereof (e.g., feature 304$_{1-2}$) sequentially in time.

In one or more embodiments, operation 1004 may involve detecting, through the server, a point anomaly (e.g., point anomaly 622) in the real-time data associated with the each network entity based on determining whether the real-time data falls outside a threshold expected value (e.g., max_expected_value, min_expected value) thereof. In one or more embodiments, operation 1006 may involve representing, through the server, the detected point anomaly in a full mesh Q node graph (e.g., graph 900), with Q being a number of features applicable for the each network entity. In one or more embodiments, operation 1008 may involve capturing, through the server, a transition in the point anomaly associated with a newly detected anomaly or non-anomaly in the real-time data associated with one or more feature(s) of the Q number of features via the representation of the full mesh Q node graph. In one or more embodiments, operation 1010 may then involve deriving, through the server, a current data correlation score (e.g., data correlation score 624) for the point anomaly across the captured transition as $$CS = \sum_{i=1}^{APC} \frac{\left(1 - \frac{EWP_i}{TSAC}\right)}{APC}.$$

In one or more embodiments, CS may be the current data correlation score for the point anomaly across the captured transition, APC may be a count of a total number of pairs of Y current anomalous features in the Q number of features and may be given by $^YC_2 + {}^YC_1$, $EWP_i$ may be a weight of an edge of the pair of the Y current anomalous features in the representation of the full mesh Q node graph, and TSAC may be a total number of time samples of the point anomaly including the captured transition. In one or more embodiments, the current data correlation score may be indicative of a commonness of a combination of the Y current anomalous features contributing to the point anomaly with respect to an equivalent Y anomalous features contributing to another previously detected point anomaly associated with the each network entity.

Figure 11:
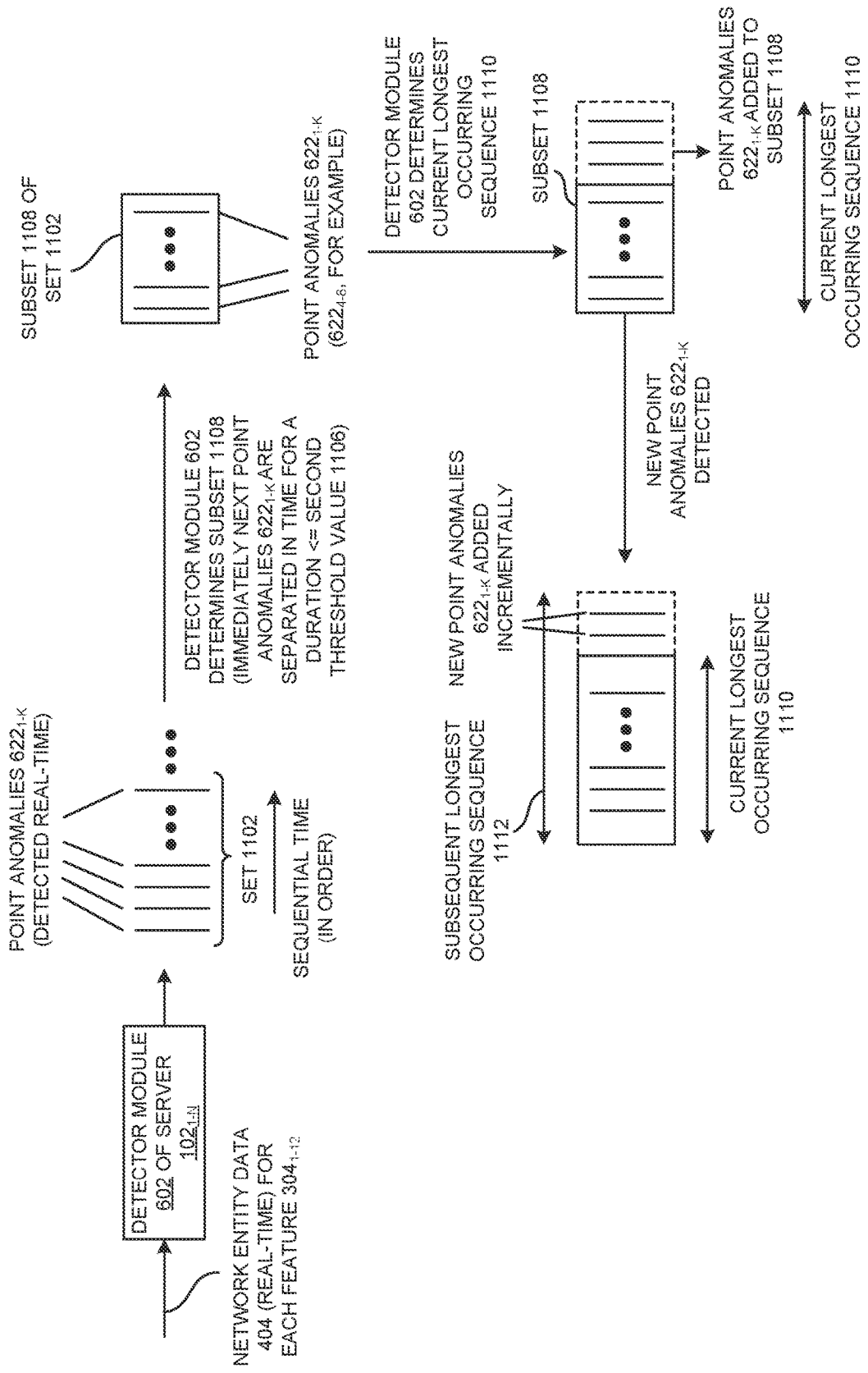
FIG. 11 is a schematic view of determination of a longest occurring sequence of point anomalies in network entity features in the cloud computing system of FIGS. 1, 4, 6 and 7, according to one or more embodiments.

FIG. 11 explicates determination of longest occurring sequence 632 of point anomalies 622 discussed above, according to one or more embodiments. In one or more embodiments, the aforementioned process may be asynchronously performed (e.g., through detector module 602 (e.g., based on executing optimization algorithm 630) of server 102$_{1-N}$) to crawl (or, scan) through all point anomalies 622 and determine a continuous anomaly event 628 that can be considered as signifying a data pattern (e.g., unintended) change, again as seen above. Further, as seen above, in one or more embodiments, the aforementioned process may be effected through detector module 602 reading network entity data 404 in real-time for each feature 304$_{1-12}$ (12 is merely indicative and not restrictive) thereof for predefined time interval 604.

In one or more embodiments, detector module 602 may detect a set of point anomalies (e.g., set 1102 including point anomalies 622$_{1-K}$) in real-time network entity data 404 for the each feature 304$_{1-12}$ thereof in sequential time based on determining whether said real-time network entity data 404 falls outside one or more first threshold expected value(s) 1104$_{1-R}$ (e.g., min_expected_value, max_expected_value discussed above) thereof. In one or more embodiments, suffix 1-K may indicate a sequential order of point anomalies 622$_{1-K}$ within set 1102 in time, whereby point anomaly 622$_1$ detected is immediately followed in time by point anomaly 622$_2$, which, in turn, is immediately followed in time by point anomaly 622$_3$ and so on. In one or more embodiments, when detector module 602 determines that a subset 1108 of set 1102 or the entirety of set 1102 includes immediately next (in time; point anomaly 622$_1$ and point anomaly 622$_2$; point anomaly 622$_2$ and point anomaly 622$_3$ and so on) point anomalies 622$_{1-K}$ that are separated in time by a time value equal to or below a second threshold value 1106 (e.g., 30 seconds, 1 minute, 5 minutes), subset 1108 (or the entirety of set 1102) may be determined to be a sequential series of continuous anomalies.

Now, in one or more embodiments, every point anomaly 622$_{1-K}$ outside subset 1108 may be incrementally added by detector module 602 in an order of the sequential time to the sequential series of continuous anomalies (or subset 1108) until a point anomaly 622$_{1-K}$ to be added is separated in time from a last (most recently) added point anomaly to subset 1108 for a duration above second threshold value 1106 to determine a current longest occurring sequence 1110 of anomalies in set 1102. Thus, in one or more embodiments, in light of new point anomalies 622$_{1-1}$ (of set 1102 being detected, performance of determination of a subsequent longest occurring sequence 1112 of anomalies may be improved based on detector module 602 combining current longest occurring sequence 1110 incrementally with one or more new point anomalies 622$_{1-K}$ of set 1102 as compared to detector module 602 iterating (repeatedly) through an entirety of the sequence in time.

Figure 12:
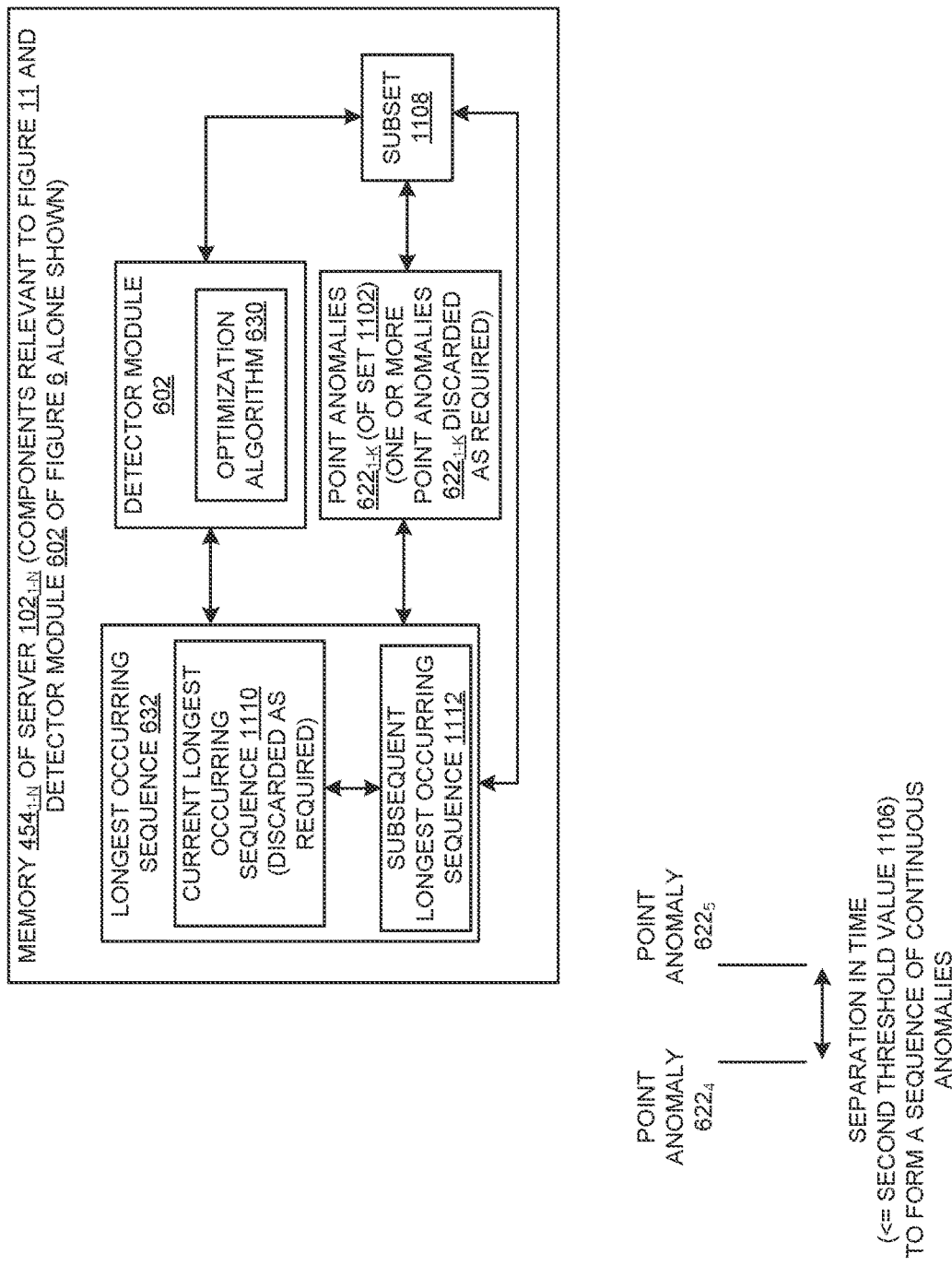
FIG. 12 is a schematic view of further optimization of the determination of the longest occurring sequence of FIGS. 6 and 11, according to one or more embodiments.

FIG. 12 shows further optimization involved in the process discussed with regard to FIG. 11, according to one or more embodiments. In one or more embodiments, as shown in FIG. 12, current longest occurring sequence 1110 may be cached/stored in memory $454_{1-N}$ of server $102_{1-N}$ as longest occurring sequence 632. In one or more embodiments, point anomalies $622_{1-K}$ of subset 1108 and any subsequent additions thereto as part of current longest occurring sequence 1110 may also be cached/stored in memory $454_{1-N}$. In one or more implementations, a snapshot of current longest occurring sequencing 1110 may be stored/cached in memory $454_{1-N}$. Further, in one or more embodiments, whenever a point anomaly $622_{1-K}$ of set 1102 is detected after second threshold value 1106 in time elapses with respect to an immediately previous detected point anomaly $622_{1-K}$, said point anomaly $622_{1-K}$ may be cleared out from memory $454_{1-N}$ by detector module 602.

Also, in one or more embodiments, in accordance with detector module 602 determining that two continuous detected point anomalies $622_{1-K}$ of set 1102 are separated in time by more than second threshold value 1106, detector module 602 may restart the determining of subset 1108 as the sequential series of continuous anomalies from a most recently detected point anomaly $622_{1-K}$ (of the two continuous detected point anomalies $622_{1-K}$. Last but not the least, in one or more embodiments, detector module 602 may discard current longest occurring sequence 1110 in the determination of subsequent longest occurring sequence 1112 based on determining that a new point anomaly $622_{1-K}$ of the new point anomalies $622_{1-K}$ discussed above immediately following a last point anomaly $622_{1-K}$ of current longest occurring sequence 1110 is separated in time therefrom by more than second threshold value 1106 in time. Thus, FIG. 12 also shows subsequent longest occurring sequence 1112 (e.g., built on current longest occurring sequence 1110) stored as longest occurring sequence 632.

Figure 13:
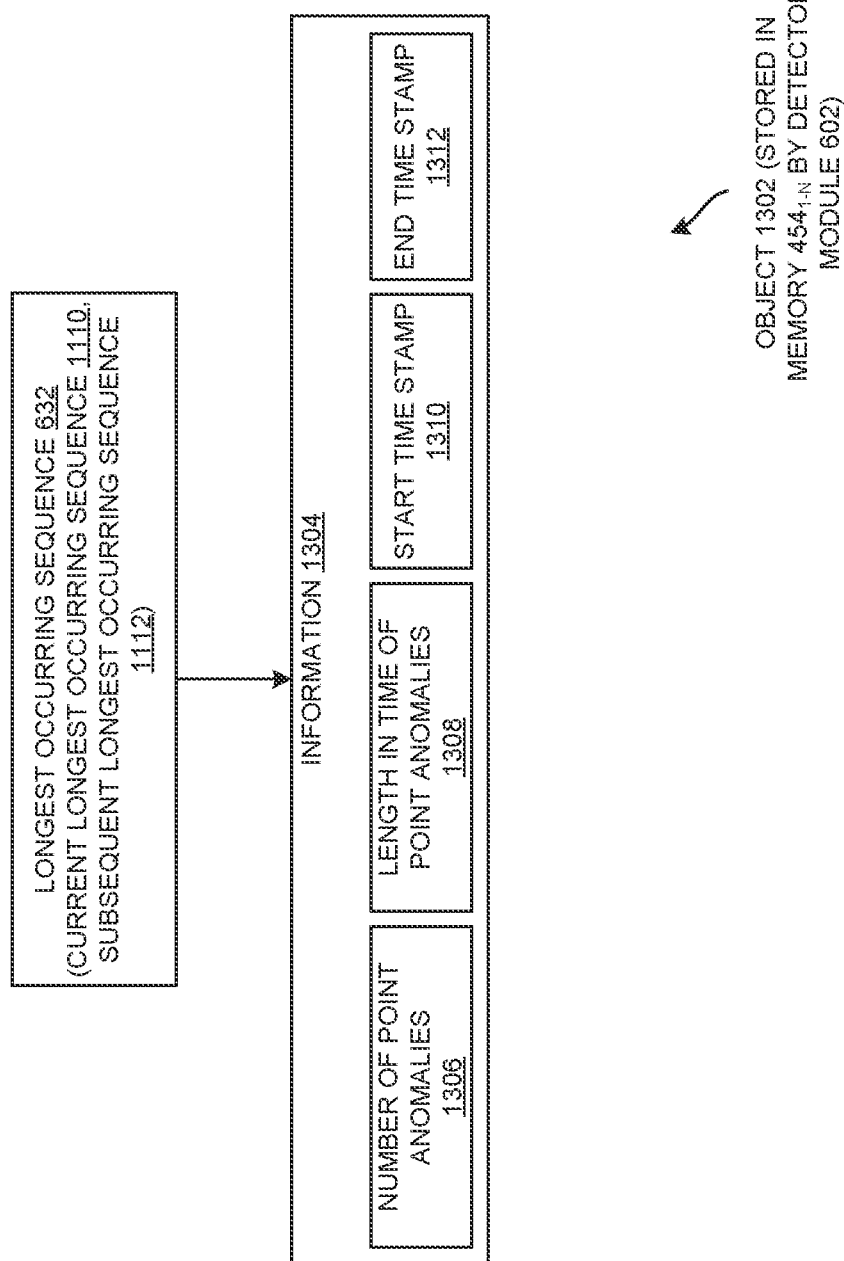
FIG. 13 is a schematic view of the longest occurring sequence of FIGS. 6 and 11 as an object, according to one or more embodiments.

In one or more embodiments, if point anomalies $622_{1-K}$ of longest occurring sequence 632 are determined to contribute to the data pattern change discussed above for more than, say, PC (e.g., 10) times, then continuous anomaly event 628 may be interpreted as signifying said data pattern change. FIG. 13 shows longest occurring sequence 632 (e.g., current longest occurring sequence 1110, subsequent longest occurring sequence 1112) implemented (e.g. through detector module 602) as an object 1302 including information 1304 pertaining to a number of point anomalies 1306 and a length in time of point anomalies 1308 therein, according to one or more embodiments. Here, in one or more embodiments, information 1304 may further include a start time stamp 1310 and an end time stamp 1312 of each of the point anomalies $622_{1-K}$ in longest occurring sequence 632 (e.g., current longest occurring sequence 1110 and/or subsequent longest occurring sequence 1112). As shown in FIG. 13, object 1302 may be stored in memory $454_{1-N}$ of server $102_{1-N}$.

Thus, in one or more embodiments, object 1302 and the implementation of determination of longest occurring sequence 632 (e.g., current longest occurring sequence 1110 and/or subsequent longest occurring sequence 1112) discussed above may enable detector module 602 to find long sequences of point anomalies $622_{1-K}$ incrementally with new point anomalies $622_{1-K}$. In one or more embodiments, the saving/caching of point anomalies $622_{1-K}$/longest occurring sequence 632 in memory $454_{1-N}$ may preserve information 1304 such that performance of determination of subset 1108, continuous anomaly event 628 and/or other elements may be drastically improved compared to iterating through the entirety of the sequence in time discussed above.

Figure 14:
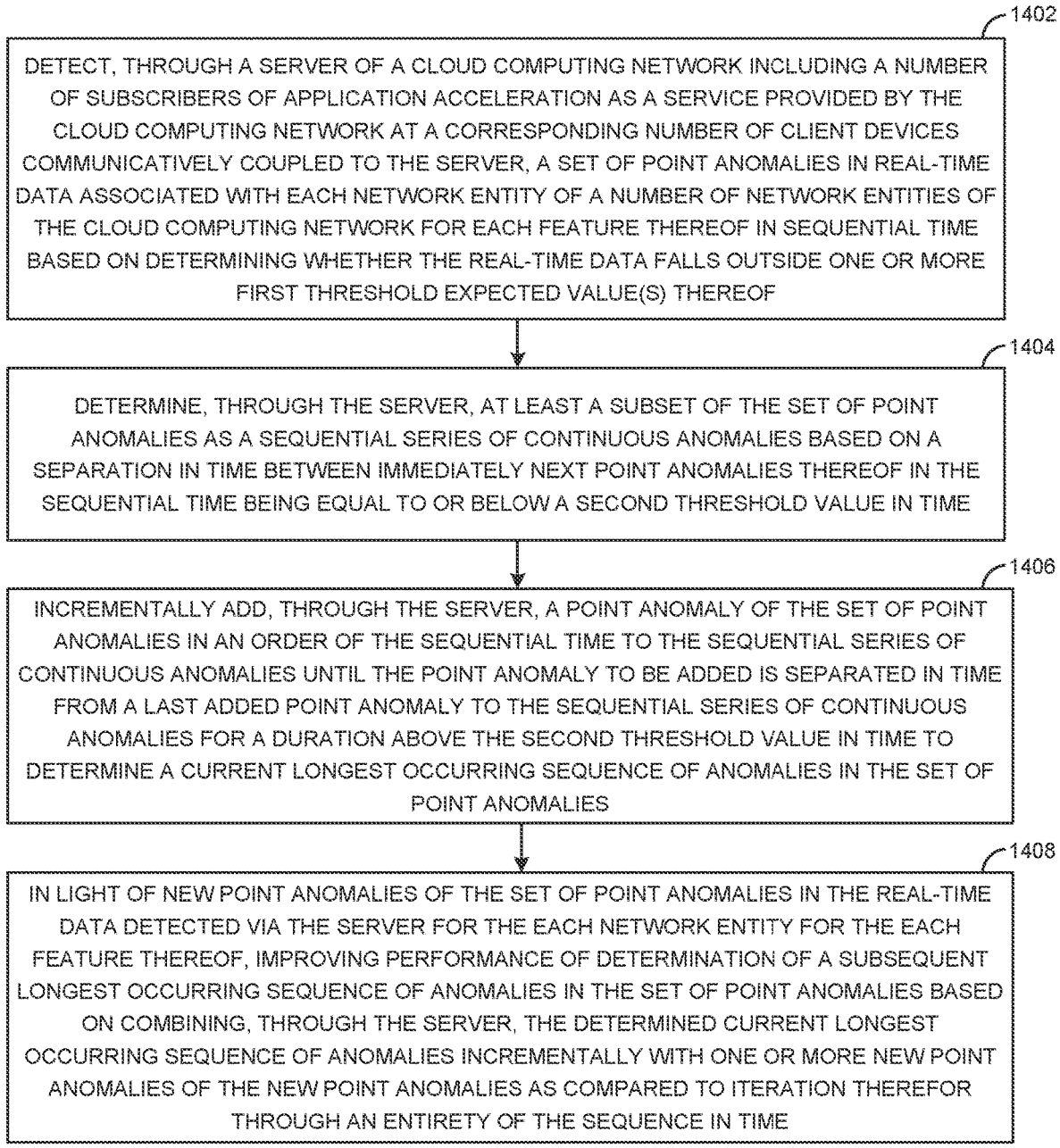
FIG. 14 is a process flow diagram detailing the operations involved in improving performance of point anomaly based data pattern change detection associated with network entity features in a cloud-based application acceleration as a service environment, according to one or more embodiments.

Further, it should be noted that all relevant concepts discussed with regard to FIGS. 1-10 are applicable to the discussion with regard to FIGS. 11-13. FIG. 14 shows a process flow diagram detailing the operations involved in improving performance of point anomaly based data pattern change detection associated with network entity features in a cloud-based application acceleration as a service environment, according to one or more embodiments. In one or more embodiments, operation 1402 may involve detecting, through a server (e.g., server $102_{1-N}$) of a cloud computing network (e.g., cloud computing system 100) including a number of subscribers (e.g., users $180_{1-M}$) of application acceleration as a service provided by the cloud computing network at a corresponding number of client devices (e.g., client devices $104_{1-M}$) communicatively coupled to the server, a set (e.g., set 1102) of point anomalies (e.g., point anomalies 622, point anomalies $622_{1-K}$) in real-time data (e.g., network entity data 404) associated with each network entity of a number of network entities (e.g., network entities $302_{1-4}$) of the cloud computing network for each feature (e.g., feature $304_{1-12}$) thereof in sequential time based on determining whether the real-time data falls outside one or more first threshold expected value(s) (e.g., first threshold expected value(s) $1104_{1-R}$ (e.g., max_expected_value, min_expected_value)) thereof.

In one or more embodiments, operation 1404 may involve determining, through the server, at least a subset (e.g., subset 1108) of the set of point anomalies as a sequential series of continuous anomalies based on a separation in time between immediately next point anomalies thereof in the sequential time being equal to or below a second threshold value (e.g., second threshold value 1106) in time. In one or more embodiments, operation 1406 may involve incrementally adding, through the server, a point anomaly of the set of point anomalies in an order of the sequential time to the sequential series of continuous anomalies until the point anomaly to be added is separated in time from a last added point anomaly to the sequential series of continuous anomalies for a duration above the second threshold value in time to determine a current longest occurring sequence (e.g., current longest occurring sequence 1110) of anomalies in the set of point anomalies.

In one or more embodiments, operation 1408 may then involve, in light of new point anomalies of the set of point anomalies in the real-time data detected via the server for the each network entity for the each feature thereof, improving performance of determination of a subsequent longest occurring sequence (e.g., subsequent longest occurring sequence 1112) of anomalies in the set of point anomalies based on combining, through the server, the determined current longest occurring sequence of anomalies incrementally with one or more new point anomalies of the new point anomalies as compared to iteration therefor through an entirety of the sequence in time.

Figure 15:
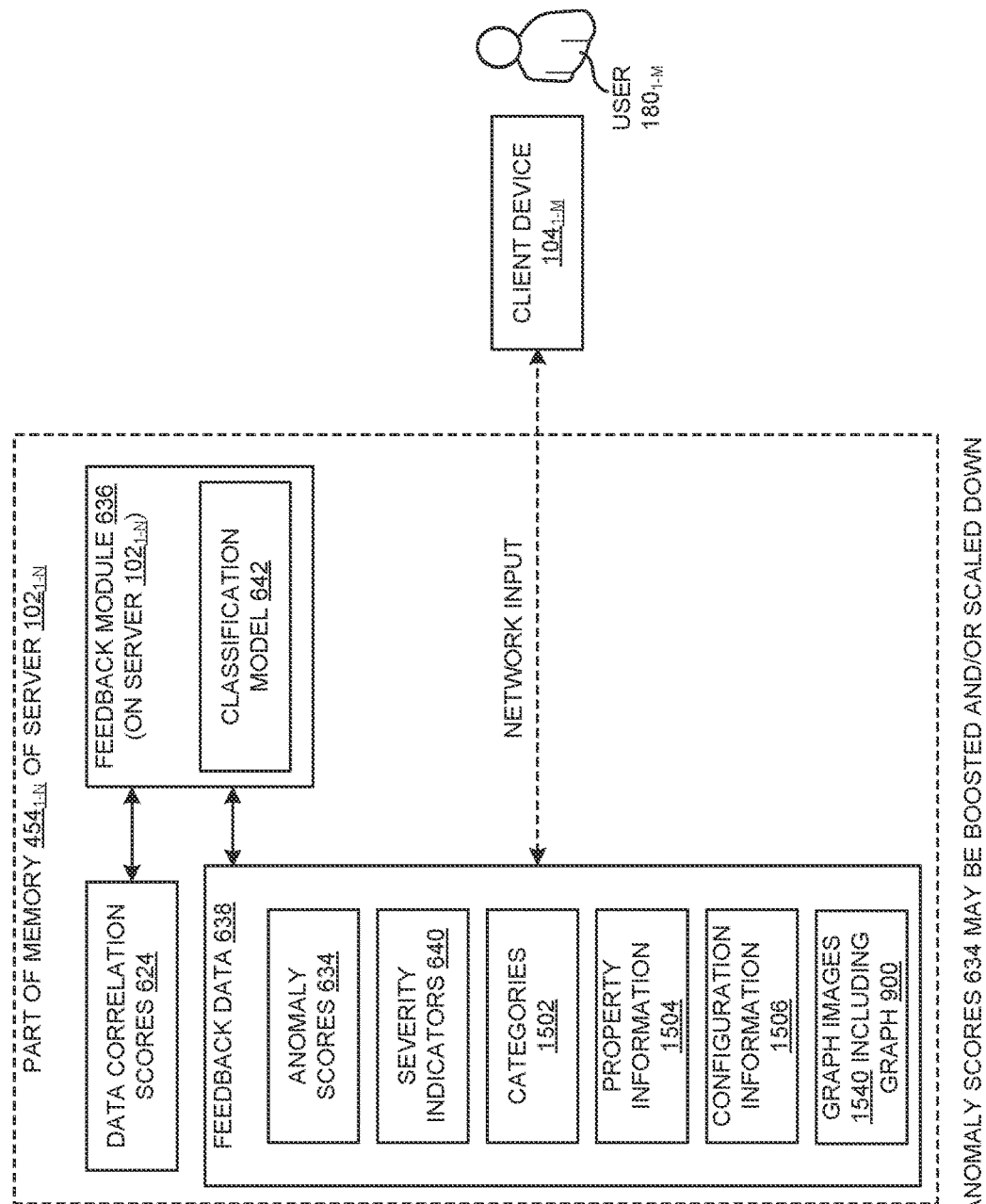
FIG. 15 is a schematic view of a feedback mechanism implemented through the feedback module of FIG. 6, according to one or more embodiments.

Referring back to FIGS. 6-7, in one or more embodiments, feedback module 636 executing on server $102_{1-N}$ may also interact with other external services in cloud computing system 100 to determine any flagged entities or network entities (e.g., network entities $302_{1-4}$) that are, for example, under scheduled maintenance. FIG. 15 shows the feedback mechanism discussed above with respect to feedback module 636 of FIG. 6, according to one or more embodiments. FIG. 15 only shows selective components therein for the sake of clarity. However, it should be noted that all discussions accompanying FIGS. 6 and 7 are also applicable to those accompanying FIG. 15-17. As seen above, in one or more embodiments, feedback data 638 for events (e.g., continuous anomaly events 628, events $706_{1-Z}$) including anomaly scores 634 (e.g., cumulative scores) and severity indicators 640 associated with the events may at least be partially constituted based on inputs from user(s) $180_{1-M}$ (e.g., experts, administrators, users) at client devices $104_{1-M}$. Thus, in one or more embodiments, a user $180_{1-M}$ may provide feedback on severity of the events based on factors such as better insider awareness, better context awareness, better knowledge of prediction models and so on. In other words, in one or more embodiments, user $180_{1-M}$ may determine/input one or more severity indicators 640 (or, one or more of feedback data 638 in general) to enable classification model 642 implemented through feedback module 636 to consider severity indicators 640 as labels of the events.

In addition, in one or more embodiments, feedback module 636 may take as input from user $180_{1-M}$ a class (a category 1502 of categories 1502) to which an event (e.g., a continuous anomaly event 628, an event $706_{1-Z}$) belongs to as part of feedback data 638. Thus, in one or more embodiments, feedback data 638 including severity indicators 640 and categories 1502, along with property information 1504 and configuration information 1506 of network entities $302_{1-4}$, may be saved to memory $454_{1-N}$ (e.g., as a snapshot to a database). To clarify further, in one or more embodiments, feedback data 638 may include a category 1502 of an event (e.g., continuous anomaly event 628, event $706_{1-Z}$) for a network entity $302_{1-4}$ and anomaly scores 634 for each feature $304_{1-12}$ thereof. In one or more embodiments, this may be taken for each network entity $302_{1-4}$ for each feature $304_{1-12}$ thereof.

In one or more embodiments, feedback data 638 may be collected for events (e.g., continuous anomaly events 628, events $706_{1-Z}$) and fed into feedback module 636 in order that classification model 642 may be built. In one or more embodiments, the aforementioned may help severity predictions. In accordance with discussions relevant to FIGS. 6 and 7, boosting (scaling up) or scaling down one or more anomaly scores 634 may impact event score $708_{1-Z}$ for the corresponding event (e.g., continuous anomaly event 628, event $706_{1-Z}$) computed through reporting module 702. In one or more embodiments, reporting mechanism 704 implemented through reporting module 702 may alert users $180_{1-M}$ of the events that are collected therethrough. In one or more embodiments, said events may also be ranked by reporting module 702; one or more algorithm(s) for said ranking may be augmented with categories 1502 (or, categories 1608 to be seen below) that are determined through classification model 642 for feedback data 638; classification model 642 may predict a category (e.g., category 1608) of an event (e.g., continuous anomaly event 628, event $706_{1-Z}$).

In one or more embodiments, feedback data 638 may be stored in memory $454_{1-N}$. In one or more embodiments, for each feature $304_{1-12}$ of network entity $302_{1-4}$, graph images 1540 may be generated as a time series, with each graph image 1540 representing one or more point anomalies $622_{1-K}$ (discussed above. For example, as shown in FIG. 15 (and FIG. 16), graph images 1540 may include graph 900 discussed above.

Figure 16:
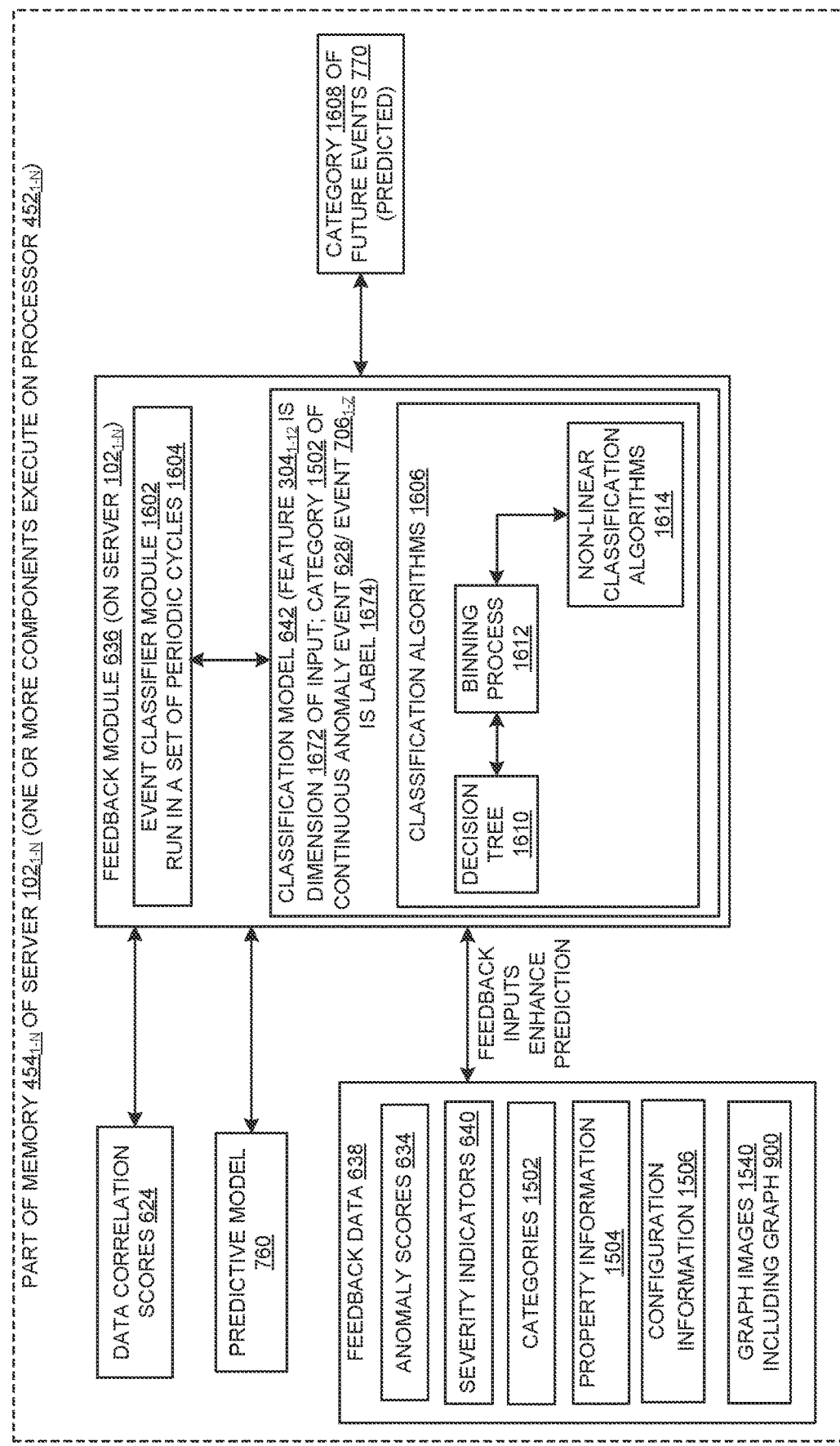
FIG. 16 is a schematic view of an event classifier module implemented as part of the feedback module of FIGS. 6, 7 and 15, according to one or more embodiments.

FIG. 16 shows an event classifier module 1602 implemented as part of feedback module 636, according to one or more embodiments. In one or more embodiments, event classifier module 1602 may run in a set of periodic cycles 1604. In one or more embodiments, on every cycle 1604, event classifier module 1602 may read feedback data 638 and build classification model 642 therefrom. In one or more embodiments, in case of availability of a pre-existing classification model, said classification model 642 may replace the pre-existing classification model. In one or more embodiments, classification model 642 may utilize anomaly scores 634 for each event as an input, each feature $304_{1-12}$ of a network entity $302_{1-4}$ as a dimension (e.g., dimension 1672) of the input and category 1502 (e.g., based on severity indicators 640) of the event as a label (e.g., label 1674) of the event. In one or more embodiments, predictive model 760 discussed above may be built based on feedback data 638 and one or more classification algorithm(s) 1606 (e.g., implemented through classification model 642). In one or more embodiments, said predictive model 760, as discussed above, may classify future events 770 into categories 1608 (e.g., categories 1502) of problems $750_{1-4}$. In one example implementation, future events 770 may be classified using a simple decision tree 1610. In one or more embodiments, anomaly scores 634 for each feature $304_{1-12}$ of a network entity 30214 in the event may be subjected to a binning process 1612 (an example classification process) that truncates said anomaly scores 634. In one example implementation, anomaly scores 634 may be truncated to a single floating point. If anomaly scores 634 are in the range of 0-1, binning anomaly scores 634 to one floating point may lead to 10 different possibilities thereof.

Thus, in one or more embodiments, a simple decision tree (e.g., decision tree 1610) may work well in most cases, especially in the initial phases of there being a lesser number of feedbacks by way of feedback data 638 that slowly grows. In one or more embodiments, large amounts of feedback data 638 and/or many features $304_{1-12}$ (or, $304_{1-Q}$) of a network entity $302_{1-4}$ for each event may warrant use of one or more non-linear classification algorithm(s) 1614 (e.g., based on neural networks) that are part of classification algorithm(s) 1606.

In one or more embodiments, feedback module 636 may utilize predictive model 760 to predict categories 1608 of future events 770. In one or more implementations, predictive model 760 may determine probability of an event belonging to a category 1608 and category 1608 used to provide a more concise definition of the event. In one or more embodiments, severity indicators 640 provided to the events may not only influence visibility thereof to a user $180_{1-M}$ but also refine future anomalous events. Thus, in one or more embodiments, feedback module 636 may enhance predictions of predictive model 760 by giving weights to human inputs. Further, in one or more embodiments, feedback module 636 on server $102_{1-N}$ may be trained (e.g., using computer vision) to identify patterns from graph images 1540 for each continuous anomaly event 628/event $706_{1-Z}$ and utilize said graph images 1540 to predictively classify future events 760 into categories (e.g., category 1608) of problems.

Figure 17:
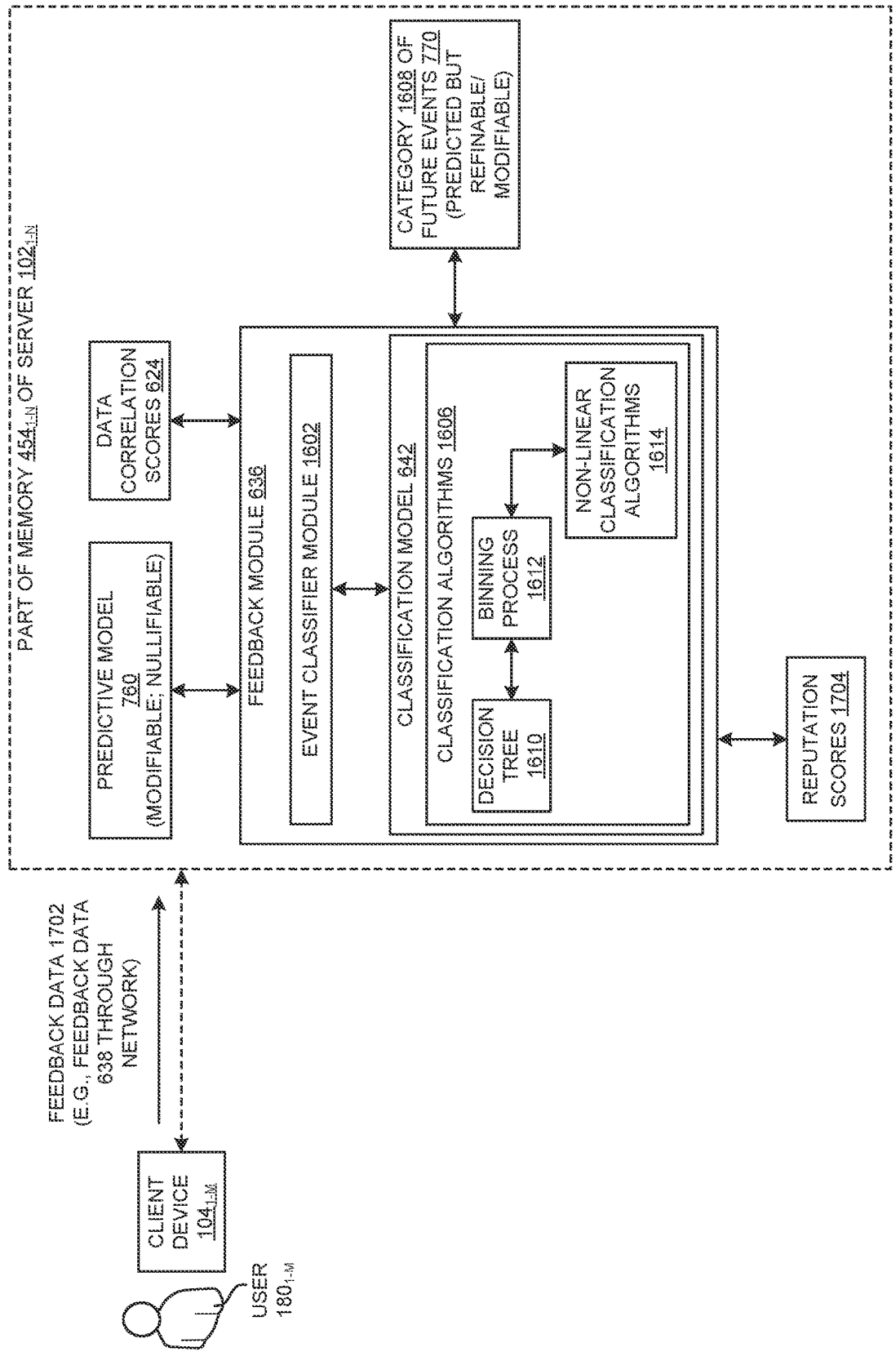
FIG. 17 is a schematic view of inputs from a user at a client device in the form of feedback data to the feedback module of FIGS. 6, 7, 15 and 16 to enhance prediction therethrough, according to one or more embodiments.

FIG. 17 shows inputs from a user $180_{1-M}$ at a client device $104_{1-M}$ in the form of feedback data 1702 (e.g., feedback data 638). In one or more embodiments, predictive model 760 currently built may be nullified or modified based on consideration of feedback data 1702 as constituting superior prudence. For example, previous inputs from user $180_{1-M}$ and/or reputation scores 1704 (e.g., predefined, dynamically computed based on historical inputs) thereof may be used to allow for nullification or modification of predictive model 760 and/or categories 1608 (e.g., categories 1502). In one implementation, user $180_{1-M}$ may reclassify events (e.g., continuous anomaly events 628, events 706$_{1-Z}$, future events 770) based on anomaly scores 634 (e.g., booster or scaled or as is) across categories 1502/1608 (e.g., under another category/predicted category 1502/1608; and this may be input as feedback data 638) and/or under new categories 1502/1608 (e.g., input as feedback data 638). In some embodiments, user 180$_{1-M}$ may nullify or modify (e.g., suggest and/or input a new predictive model and/or one or more elements thereof) predictive model 760 through a user interface (not shown) on client device 104$_{1-M}$ thereof provided through server 102$_{1-N}$; user 180$_{1-M}$ may even provide inputs for detecting new events.

In one scenario, prediction model 760 may classify an event 706$_{1-Z}$ as belonging to a category 1608/1502 of latency and another event 706$_{1-Z}$ under another category 1608/1502 of network features. Feedback data 1702 from user 180$_{1-M}$ may enable regarding the another event 706$_{1-Z}$ as a non-issue because user 180$_{1-M}$ may possess more context/insider information regarding cloud computing system 100; for example, network entity data 404 relevant to the another event 706$_{1-Z}$ may have been anomalous because of filtering thereof through a firewall device (not shown) of cloud computing system 100. In one or more embodiments, in an Artificial Intelligence (AI)/Machine Learning (ML) context of predictive model 760, predictive model 760 may be refined continuously, frequently and/or periodically for future predictions. In one or more embodiments, the refinement may be aided by computation of data correlation scores 624 discussed above that reflect commonness of an event/pattern, i.e., combinations of features 304$_{1-12}$ that have led to the event; said data correlation scores 624 may be employed in the prediction of categories 1608 of future events 770. Thus, in one or more embodiments, even events under different categories 1608/1502 may have other commonalties therebetween. All reasonable variations are within the scope of the exemplary embodiments discussed herein.

Figure 18:
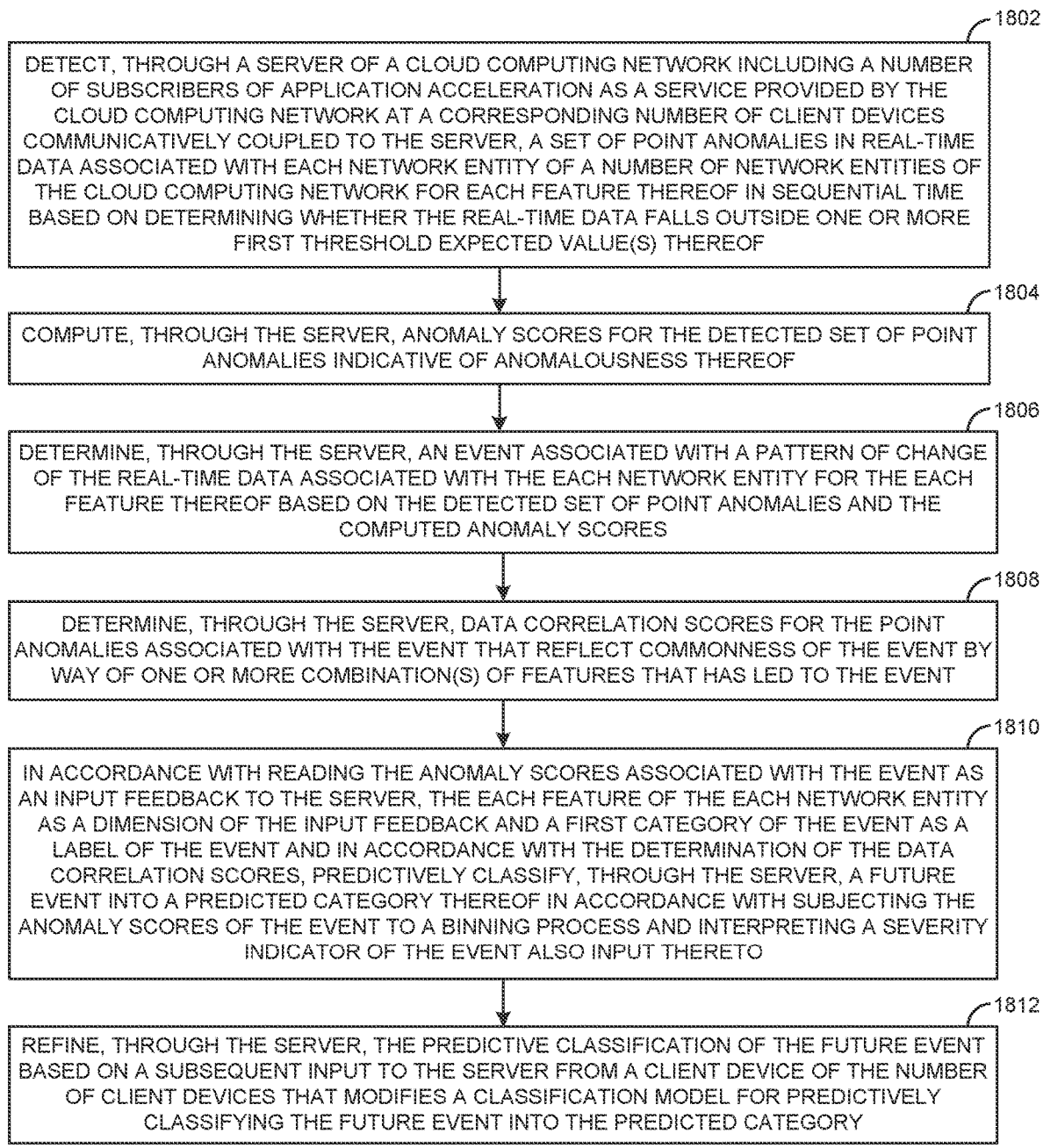
FIG. 18 is a process flow diagram detailing the operations involved in enhanced predictive classification of anomalous events in a cloud-based application acceleration as a service environment, according to one or more embodiments.

FIG. 18 shows a process flow diagram detailing the operations involved in enhanced predictive classification of anomalous events in a cloud-based application acceleration as a service environment (e.g., cloud computing system 100), according to one or more embodiments. In one or more embodiments, operation 1802 may involve detecting, through a server (e.g., server 102$_{1-N}$) of a cloud computing network (e.g., cloud computing system 100) including a number of subscribers (e.g., users 180$_{1-M}$) of application acceleration as a service provided by the cloud computing network at a corresponding number of client devices (e.g., client devices 104$_{1-M}$) communicatively coupled to the server, a set of point anomalies (e.g., point anomalies 622, point anomalies 622$_{1-K}$ in real-time data (e.g., network entity data 404) associated with each network entity of a number of network entities (e.g., network entities 302$_{1-4}$) of the cloud computing network for each feature (e.g., features 304$_{1-2}$) thereof in sequential time based on determining whether the real-time data falls outside one or more first threshold expected value(s) (e.g., first threshold expected value(s) 1104$_{1-R}$ (e.g., min_expected_value, max_expected_value discussed above)) thereof.

In one or more embodiments, operation 1804 may involve computing, through the server, anomaly scores (e.g., anomaly scores 634) for the detected set of point anomalies indicative of anomalousness thereof. In one or more embodiments, operation 1806 may involve determining, through the server, an event (e.g., continuous anomaly event 628, event 706$_{1-Z}$) associated with a pattern of change of the real-time data associated with the each network entity for the each feature thereof based on the detected set of point anomalies and the computed anomaly scores. In one or more embodiments, operation 1808 may involve determining, through the server, data correlation scores (e.g., data correlation scores 624) for the point anomalies associated with the event that reflect commonness of the event by way of one or more combination(s) of features that has led to the event.

In one or more embodiments, operation 1810 may involve, in accordance with reading the anomaly scores associated with the event as an input feedback to the server, the each feature of the each network entity as a dimension (e.g., dimension 1672) of the input feedback and a category (e.g., category 1502) of the event as a label (e.g., label 1674) of the event and in accordance with the determination of the data correlation scores, predictively classifying, through the server, a future event (e.g., future event 770) into a predicted category (e.g., category 1608) thereof in accordance with subjecting the anomaly scores associated with the event to a binning process (e.g., binning process 1612) and interpreting a severity indicator (e.g., severity indicator 640) of the event also input thereto. In one or more embodiments, operation 1812 may then involve refining, through the server, the predictive classification of the future event based on a subsequent input to the server from a client device of the number of client devices that modifies a classification model (e.g., classification model 642) for predictively classifying the future event into the predicted category. All reasonable variations are within the scope of the exemplary embodiments discussed herein.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., one or more server(s) 102$_{1-N}$), and may be performed in any order (e.g., including using means for achieving the various operations). Accordingly, the specification and drawings are to be regarded in an illustrative rather than a restrictive sense.

What is claimed is:
1. A method of a computing network implemented in a data processing device comprising a processor communicatively coupled to a memory, comprising:
   detecting real-time data associated with each network entity of a plurality of network entities of the computing network for each feature thereof sequentially in time;
   detecting a point anomaly in the real-time data associated with the each network entity based on determining whether the real-time data falls outside a threshold expected value thereof;
   representing the detected point anomaly in a full mesh Q node graph, wherein Q is a number of features applicable for the each network entity;

capturing a transition in the point anomaly associated with a newly detected one of: anomaly and non-anomaly in the real-time data associated with at least one feature of the Q number of features via the representation of the full mesh Q node graph; and deriving a current data correlation score for the point anomaly across the captured transition as:

$$CS = \sum_{i=1}^{APC} \frac{\left(1 - \frac{EWP_i}{TSAC}\right)}{APC},$$

wherein CS is the current data correlation score for the point anomaly across the captured transition, APC is a count of a total number of pairs of Y current anomalous features in the Q number of features and is given by $^Y C_2 + ^Y C_1$, $EWP_i$ is a weight of an edge of the $i^{th}$ pair of the Y current anomalous features in the representation of the full mesh Q node graph, and TSAC is a total number of time samples of the point anomaly comprising the captured transition, and wherein the current data correlation score is indicative of a commonness of a combination of the Y current anomalous features contributing to the point anomaly with respect to an equivalent Y anomalous features contributing to another previously detected point anomaly associated with the each network entity.

2. The method of claim 1, comprising the threshold expected value being one of: a maximum expected value and a minimum expected value.

3. The method of claim 1, further comprising detecting at least one anomaly in the real-time data associated with the each network entity for the each feature thereof including the point anomaly in accordance with computing a score for the at least one anomaly indicative of anomalousness thereof, the computation of the score involving both relative scoring and absolute deviation scoring, and the absolute deviation scoring being based on previous data deviations from reference data bands.

4. The method of claim 3, further comprising determining an event associated with a pattern of change of the real-time data associated with the each network entity based on executing an optimization algorithm to determine, among all features of the each network entity, a series of anomalies comprising the detected at least one anomaly that constitutes a sequence of patterned anomalies in accordance with scanning detected anomalies associated with the real-time data associated with the each network entity including the detected at least one anomaly.

5. The method of claim 4, wherein determining the event based on executing the optimization algorithm further comprises finding, based on at least one dynamic programming technique, a longest occurring sequence of anomalies as the series of anomalies among all the features of the each network entity that is capable of being interleaved for a specific duration.

6. The method of claim 4, further comprising enabling predictive classification of a future event associated with the each network entity into a category of determined problems based on the determined event associated with the pattern of change of the real-time data associated with the each network entity.

7. The method of claim 4, further comprising at least one of:

collecting feedback from another data processing device of the computing network communicatively coupled to the data processing device via the computing network;

determining a severity indicator for the determined event based on the feedback from the another data processing device;

generating, utilizing the determined severity indicator, an event score for the determined event into which the current data correlation score is factored; and ranking the determined event with respect to a plurality of events based on the generated event score.

8. A data processing device comprising:

a memory; and a processor communicatively coupled to the memory, the processor executing instructions to:

detect real-time data associated with each network entity of a plurality of network entities of a computing network for each feature thereof sequentially in time, detect a point anomaly in the real-time data associated with the each network entity based on determining whether the real-time data falls outside a threshold expected value thereof, represent the detected point anomaly in a full mesh Q node graph, wherein Q is a number of features applicable for the each network entity, capture a transition in the point anomaly associated with a newly detected one of: anomaly and non-anomaly in the real-time data associated with at least one feature of the Q number of features via the representation of the full mesh Q node graph, and derive a current data correlation score for the point anomaly across the captured transition as:

$$CS = \sum_{i=1}^{APC} \frac{\left(1 - \frac{EWP_i}{TSAC}\right)}{APC},$$

wherein CS is the current data correlation score for the point anomaly across the captured transition, APC is a count of a total number of pairs of Y current anomalous features in the Q number of features and is given by $^Y C_2 + ^Y C_1$, $EWP_i$ is a weight of an edge of the $i^{th}$ pair of the Y current anomalous features in the representation of the full mesh Q node graph, and TSAC is a total number of time samples of the point anomaly comprising the captured transition, and wherein the current data correlation score is indicative of a commonness of a combination of the Y current anomalous features contributing to the point anomaly with respect to an equivalent Y anomalous features contributing to another previously detected point anomaly associated with the each network entity.

9. The data processing device of claim 8, wherein the threshold expected value is one of: a maximum expected value and a minimum expected value.

10. The data processing device of claim 8, wherein the processor further executes instructions to detect at least one anomaly in the real-time data associated with the each network entity for the each feature thereof including the point anomaly in accordance with computing a score for the at least one anomaly indicative of anomalousness thereof, the computation of the score involving both relative scoring and absolute deviation scoring, and the absolute deviation scoring being based on previous data deviations from reference data bands.

11. The data processing device of claim 10, wherein the processor further executes instructions to determine an event associated with a pattern of change of the real-time data associated with the each network entity based on executing an optimization algorithm to determine, among all features of the each network entity, a series of anomalies comprising the detected at least one anomaly that constitutes a sequence of patterned anomalies in accordance with scanning detected anomalies associated with the real-time data associated with the each network entity including the detected at least one anomaly.

12. The data processing device of claim 11, wherein the processor executes instructions to determine the event based on executing the optimization algorithm in accordance with finding, based on at least one dynamic programming technique, a longest occurring sequence of anomalies as the series of anomalies among all the features of the each network entity that is capable of being interleaved for a specific duration.

13. The data processing device of claim 11, wherein the processor further executes instructions to enable predictive classification of a future event associated with the each network entity into a category of determined problems based on the determined event associated with the pattern of change of the real-time data associated with the each network entity.

14. The data processing device of claim 11, wherein the processor further executes instructions to at least one of:
collect feedback from another data processing device of the computing network communicatively coupled to the data processing device via the computing network,
determine a severity indicator for the determined event based on the feedback from the another data processing device,
generate, utilizing the determined severity indicator, an event score for the determined event into which the current data correlation score is factored, and
rank the determined event with respect to a plurality of events based on the generated event score.

15. A computing system comprising:
a plurality of network entities of a computer network; and
a data processing device executing instructions to:
detect real-time data associated with each network entity of the plurality of network entities for each feature thereof sequentially in time,
detect a point anomaly in the real-time data associated with the each network entity based on determining whether the real-time data falls outside a threshold expected value thereof,
represent the detected point anomaly in a full mesh Q node graph, wherein Q is a number of features applicable for the each network entity,
capture a transition in the point anomaly associated with a newly detected one of: anomaly and non-anomaly in the real-time data associated with at least one feature of the Q number of features via the representation of the full mesh Q node graph, and
derive a current data correlation score for the point anomaly across the captured transition as:

$$CS = \sum_{i=1}^{APC} \frac{\left(1 - \frac{EWP_i}{TSAC}\right)}{APC},$$

wherein CS is the current data correlation score for the point anomaly across the captured transition, APC is a count of a total number of pairs of Y current anomalous features in the Q number of features and is given by $^YC_2 + {^YC_1}$, $EWP_i$ is a weight of an edge of the $i^{th}$ pair of the Y current anomalous features in the representation of the full mesh Q node graph, and TSAC is a total number of time samples of the point anomaly comprising the captured transition, and
wherein the current data correlation score is indicative of a commonness of a combination of the Y current anomalous features contributing to the point anomaly with respect to an equivalent Y anomalous features contributing to another previously detected point anomaly associated with the each network entity.

16. The computing system of claim 15, wherein the threshold expected value is one of: a maximum expected value and a minimum expected value.

17. The computing system of claim 15, wherein the data processing device further executes instructions to detect at least one anomaly in the real-time data associated with the each network entity for the each feature thereof including the point anomaly in accordance with computing a score for the at least one anomaly indicative of anomalousness thereof, the computation of the score involving both relative scoring and absolute deviation scoring, and the absolute deviation scoring being based on previous data deviations from reference data bands.

18. The computing system of claim 17, wherein the data processing device further executes instructions to determine an event associated with a pattern of change of the real-time data associated with the each network entity based on executing an optimization algorithm to determine, among all features of the each network entity, a series of anomalies comprising the detected at least one anomaly that constitutes a sequence of patterned anomalies in accordance with scanning detected anomalies associated with the real-time data associated with the each network entity including the detected at least one anomaly.

19. The computing system of claim 18, wherein the data processing device executes instructions to determine the event based on executing the optimization algorithm in accordance with finding, based on at least one dynamic programming technique, a longest occurring sequence of anomalies as the series of anomalies among all the features of the each network entity that is capable of being interleaved for a specific duration.

20. The computing system of claim 18, wherein the data processing device further executes instructions to at least one of:
collect feedback from another data processing device of the computer network communicatively coupled to the data processing device via the computer network,
determine a severity indicator for the determined event based on the feedback from the another data processing device,
generate, utilizing the determined severity indicator, an event score for the determined event into which the current data correlation score is factored, and
rank the determined event with respect to a plurality of events based on the generated event score.

* * * * *